US00RE46326E

(19) United States
(12) Reissued Patent
Dearing et al.

(10) Patent Number: US RE46,326 E
(45) Date of Reissued Patent: Feb. 28, 2017

(54) RF POINT OF SALE AND DELIVERY METHOD AND SYSTEM USING COMMUNICATION WITH REMOTE COMPUTER AND HAVING FEATURES TO READ A LARGE NUMBER OF RF TAGS

(71) Applicant: Promega Corporation, Madison, WI (US)

(72) Inventors: Michael Dearing, Spring Green, WI (US); Gediminas Vidugiris, Fitchburg, WI (US); William A. Linton, Madison, WI (US); John Linton, San Carlos, CA (US); Julia E. Krueger, Deerfield, WI (US)

(73) Assignee: Promega Corporation, Madison, WI (US)

(21) Appl. No.: 14/602,694

(22) Filed: Jan. 22, 2015

Related U.S. Patent Documents

Reissue of:
(64) Patent No.: 8,025,228
Issued: Sep. 27, 2011
Appl. No.: 11/980,559
Filed: Oct. 31, 2007

U.S. Applications:
(63) Continuation of application No. 10/954,612, filed on Oct. 1, 2004, now Pat. No. 7,661,591, which is a
(Continued)

(51) Int. Cl.
*G06Q 30/00* (2012.01)
*G06K 7/10* (2006.01)
*G07G 1/00* (2006.01)

(52) U.S. Cl.
CPC ..... *G06K 7/10336* (2013.01); *G07G 1/0045* (2013.01)

(58) Field of Classification Search
CPC ..... G06K 7/10336; G06K 2017/0051; G06Q 10/08; G06Q 10/087; G06Q 30/06; G06Q 30/0603; G07G 1/0045
(Continued)

(56) References Cited

U.S. PATENT DOCUMENTS 3,827,053 A 7/1974 Willie et al. ..... 343/701
3,861,433 A 1/1975 Schier et al. ..... 150/0.5
(Continued)

FOREIGN PATENT DOCUMENTS

AU 2002211769 3/2007
CA 2425189 5/2002
(Continued)

OTHER PUBLICATIONS

"Asset ID", IBM Information Brief, May 2000 (5 pages).
(Continued)

*Primary Examiner* — Jalatee Worjloh
(74) *Attorney, Agent, or Firm* — McAndrews, Held & Malloy

(57) ABSTRACT

A method and system for providing point-of-sale and point-of-delivery and/or distribution of products in a restricted access unit near the customer. The method and system utilize products equipped with radio frequency tags and reduce the effects of energy sharing, shadowing, and nulls. In one embodiment, a plurality of RF tagged products are placed within a refrigerator, cabinet, or other micro-warehouse that has a door or opening that can detect access to the micro-warehouse. In one embodiment, one or more antennas are positioned within the door. Each antenna may have a transmission line of sight and be configured to emit a signal at predefined frequencies. Each antenna generates an electromagnetic field within the micro-warehouse. In one embodiment, the products are positioned in one or more bins, compartments, or similar devices located within the micro-warehouse such that at least two of the plurality of products are spaced a distance from each other to reduce energy sharing. The electromagnetic field is moved or altered within the micro-warehouse through the use of reflectors, devices that move the antennas, or other mechanisms.

36 Claims, 19 Drawing Sheets

Related U.S. Application Data continuation of application No. 10/080,330, filed on Feb. 21, 2002, now abandoned, which is a continuation-in-part of application No. 09/981,219, filed on Oct. 16, 2001, now Pat. No. 7,258,276.

(60) Provisional application No. 60/241,907, filed on Oct. 20, 2000.

(58) Field of Classification Search
USPC ..... 235/383–385, 375; 705/50, 317, 318, 2, 705/3; 920/23
See application file for complete search history.

(56) References Cited

U.S. PATENT DOCUMENTS

| | | | | |
|---|---|---|---|---|
| 3,918,671 | A | 11/1975 | Mizusawa | 248/285 |
| 4,116,512 | A | 9/1978 | Wiser | 312/330.1 |
| 4,118,693 | A | 10/1978 | Novikoff | 340/572 |
| 4,223,830 | A | 9/1980 | Walton | 235/380 |
| 4,227,037 | A | 10/1980 | Layton | |
| 4,354,613 | A | 10/1982 | Desai et al. | 221/4 |
| 4,414,690 | A | 11/1983 | Nordholt et al. | 455/283 |
| 4,496,406 | A | 1/1985 | Dedow | |
| 4,553,211 | A | 11/1985 | Kawasaki et al. | |
| 4,580,041 | A | 4/1986 | Walton | 235/380 |
| 4,616,694 | A | 10/1986 | Hsieh | 165/47 |
| 4,636,634 | A | 1/1987 | Harper et al. | 250/223 R |
| 4,636,950 | A | 1/1987 | Caswell et al. | 364/403 |
| 4,639,875 | A | 1/1987 | Abraham et al. | 364/479 |
| 4,656,463 | A | 4/1987 | Anders et al. | 340/572 |
| 4,688,026 | A | 8/1987 | Scribner et al. | 340/572 |
| 4,694,283 | A | 9/1987 | Reeb | 340/572 |
| 4,746,830 | A | 5/1988 | Holland | 310/313 D |
| 4,785,969 | A | 11/1988 | McLaughlin | 221/2 |
| 4,805,207 | A | 2/1989 | Mcnutt et al. | |
| 4,837,568 | A | 6/1989 | Snaper | 340/825.54 |
| 4,847,764 | A | 7/1989 | Halvorson | 364/413.02 |
| 4,860,918 | A | 8/1989 | Wuyten et al. | |
| 4,862,160 | A | 8/1989 | Ekchian et al. | 340/825.54 |
| 4,866,661 | A | 9/1989 | de Prins | 364/900 |
| 4,881,061 | A | 11/1989 | Chambers | 340/568 |
| 4,961,533 | A | 10/1990 | Teller et al. | 177/25.19 |
| 5,008,814 | A | 4/1991 | Mathur | 364/200 |
| 5,014,875 | A | 5/1991 | McLaughlin et al. | 221/2 |
| 5,019,815 | A | 5/1991 | Lemelson et al. | 340/933 |
| 5,021,800 | A | 6/1991 | Rilling | 343/820 |
| 5,030,807 | A | 7/1991 | Landt et al. | 235/375 |
| 5,036,308 | A | 7/1991 | Fockens | 340/572 |
| 5,038,023 | A | 8/1991 | Saliga | 235/385 |
| 5,091,713 | A | 2/1992 | Horne et al. | 340/541 |
| 5,099,226 | A | 3/1992 | Andrews | 340/572 |
| 5,103,222 | A | 4/1992 | Hogen Esch et al. | 340/825.54 |
| 5,117,407 | A | 5/1992 | Vogel | 369/30 |
| 5,144,314 | A | 9/1992 | Malmberg et al. | 342/44 |
| 5,155,847 | A | 10/1992 | Kirouac et al. | 395/600 |
| 5,194,856 | A | 3/1993 | Zijlstra | 340/825.35 |
| 5,208,599 | A | 5/1993 | Rudduck et al. | 342/4 |
| 5,214,409 | A | 5/1993 | Beigel | 340/572 |
| 5,231,844 | A | 8/1993 | Park | 62/80 |
| 5,240,139 | A | 8/1993 | Chirnomas | 221/2 |
| 5,260,690 | A | 11/1993 | Mann et al. | 340/572 |
| 5,266,925 | A | 11/1993 | Vercellotti et al. | 340/572 |
| 5,285,041 | A | 2/1994 | Wright | 219/717 |
| 5,287,414 | A | 2/1994 | Foster | 382/1 |
| 5,294,931 | A | 3/1994 | Meier | 342/44 |
| 5,327,118 | A | 7/1994 | Drucker et al. | 340/572 |
| 5,335,509 | A | 8/1994 | Namisniak et al. | 62/125 |
| 5,365,551 | A | 11/1994 | Snodgrass et al. | 375/1 |
| 5,389,919 | A | 2/1995 | Warren et al. | 340/825.31 |
| 5,392,025 | A | 2/1995 | Figh et al. | 340/545 |
| 5,408,443 | A | 4/1995 | Weinberger | 368/10 |
| 5,410,315 | A | 4/1995 | Huber | 342/42 |
| 5,421,009 | A | 5/1995 | Platt | 395/600 |
| 5,424,858 | A | 6/1995 | Gillotte | 359/143 |
| 5,431,299 | A | 7/1995 | Brewer et al. | 221/2 |
| 5,446,447 | A | 8/1995 | Carney et al. | 340/572 |
| 5,450,070 | A | 9/1995 | Massar et al. | 340/825.35 |
| 5,460,294 | A | 10/1995 | Williams | 221/2 |
| 5,471,203 | A | 11/1995 | Sasaki et al. | 340/825.31 |
| 5,478,990 | A | 12/1995 | Montanari et al. | |
| 5,487,276 | A | 1/1996 | Namisniak et al. | 62/125 |
| 5,487,764 | A | 1/1996 | Ford, Jr. | 44/553 |
| 5,489,908 | A | 2/1996 | Orthmann et al. | 342/42 |
| 5,491,715 | A | 2/1996 | Flaxl | 375/344 |
| 5,495,961 | A | 3/1996 | Maestre | 221/3 |
| 5,500,650 | A | 3/1996 | Snodgrass et al. | 342/42 |
| 5,519,381 | A | 5/1996 | Marsh et al. | 340/572 |
| 5,520,450 | A | 5/1996 | Colson, Jr. et al. | 312/215 |
| 5,521,601 | A | 5/1996 | Kandlur et al. | 342/44 |
| 5,528,222 | A | 6/1996 | Moskowitz et al. | 340/572 |
| 5,528,232 | A | 6/1996 | Verma et al. | 340/825.54 |
| 5,530,702 | A | 6/1996 | Palmer et al. | 370/85.3 |
| 5,537,105 | A | 7/1996 | Marsh et al. | 340/825.54 |
| 5,539,394 | A | 7/1996 | Cato et al. | 340/825.54 |
| 5,541,604 | A | 7/1996 | Meier | 342/42 |
| 5,550,547 | A | 8/1996 | Chan et al. | 342/42 |
| 5,557,280 | A | 9/1996 | Marsh et al. | 342/44 |
| 5,564,803 | A | 10/1996 | McDonald et al. | 312/215 |
| 5,565,858 | A | 10/1996 | Guthrie | |
| 5,573,082 | A | 11/1996 | Conlan et al. | 186/44 |
| 5,583,819 | A | 12/1996 | Roesner et al. | 365/225.7 |
| 5,600,121 | A | 2/1997 | Kahn et al. | 235/472 |
| 5,602,538 | A | 2/1997 | Orthmann et al. | 340/825.54 |
| 5,606,902 | A | 3/1997 | Hosono et al. | 92/88 |
| 5,608,298 | A | 3/1997 | Frolov et al. | 318/286 |
| 5,608,739 | A | 3/1997 | Snodgrass et al. | 371/37.1 |
| 5,621,199 | A | 4/1997 | Calari et al. | 235/375 |
| 5,627,517 | A | 5/1997 | Theimer et al. | 340/572 |
| 5,627,544 | A | 5/1997 | Snodgrass et al. | 342/42 |
| 5,629,981 | A | 5/1997 | Nerlikar | 713/168 |
| 5,648,765 | A | 7/1997 | Cresap et al. | 340/825.35 |
| 5,648,767 | A | 7/1997 | O'Connor et al. | 340/928 |
| 5,680,459 | A | 10/1997 | Hook et al. | 380/23 |
| 5,686,902 | A | 11/1997 | Reis et al. | 340/825.54 |
| 5,689,238 | A | 11/1997 | Cannon, Jr. et al. | 340/568 |
| 5,699,066 | A | 12/1997 | Marsh et al. | 342/44 |
| 5,701,252 | A | 12/1997 | Facchin et al. | 364/479 |
| 5,703,347 | A | 12/1997 | Reddersen et al. | 235/472 |
| 5,708,423 | A | 1/1998 | Ghaffari et al. | 340/825.35 |
| 5,711,160 | A | 1/1998 | Namisniak et al. | 62/125 |
| 5,713,485 | A | 2/1998 | Liff et al. | 221/2 |
| RE35,743 | E | 3/1998 | Pearson | 221/2 |
| 5,726,630 | A | 3/1998 | Marsh et al. | 340/572 |
| 5,739,765 | A | 4/1998 | Stanfield et al. | |
| 5,742,618 | A | 4/1998 | Lowe | 371/36 |
| 5,745,036 | A | 4/1998 | Clare | 340/572 |
| 5,745,366 | A | 4/1998 | Higham et al. | 364/479.12 |
| 5,751,221 | A | 5/1998 | Stanfield et al. | 340/825.35 |
| 5,764,992 | A | 6/1998 | Kullick et al. | 395/712 |
| 5,765,707 | A | 6/1998 | Kenevan | |
| 5,771,003 | A | 6/1998 | Seymour | |
| 5,774,053 | A | 6/1998 | Porter | 340/568 |
| 5,774,059 | A | 6/1998 | Henry et al. | |
| 5,774,876 | A | 6/1998 | Woolley et al. | 705/28 |
| 5,777,561 | A | 7/1998 | Chieu et al. | 340/825.54 |
| 5,786,763 | A | 7/1998 | Canipe | 340/572 |
| 5,787,174 | A | 7/1998 | Tuttle | 380/23 |
| H1743 | H | 8/1998 | Graves et al. | 364/479.06 |
| 5,797,515 | A | 8/1998 | Liff et al. | 221/2 |
| 5,798,693 | A | 8/1998 | Engellenner | 340/505 |
| 5,798,694 | A | 8/1998 | Reber et al. | 340/540 |
| 5,801,628 | A | 9/1998 | Maloney | 340/568 |
| 5,805,455 | A | 9/1998 | Lipps | 364/479.01 |
| 5,805,456 | A | 9/1998 | Higham et al. | 364/479.06 |
| 5,805,897 | A | 9/1998 | Glowny | 395/712 |
| 5,809,230 | A | 9/1998 | Pereira | |
| 5,818,348 | A | 10/1998 | Walczak et al. | 340/825.54 |
| 5,822,692 | A | 10/1998 | Krishan et al. | 455/419 |
| 5,822,714 | A * | 10/1998 | Cato | 702/108 |
| 5,825,806 | A | 10/1998 | Tuttle | 375/200 |
| 5,831,531 | A | 11/1998 | Tuttle | 340/572 |
| 5,836,618 | A | 11/1998 | Perlman | 283/70 |
| 5,841,770 | A | 11/1998 | Snodgrass et al. | 370/346 |

(56) References Cited

U.S. PATENT DOCUMENTS 5,842,118 A 11/1998 Wood, Jr. ..... 455/101
5,842,976 A 12/1998 Williamson ..... 600/300
5,852,911 A 12/1998 Yuyama et al. ..... 53/168
5,857,152 A 1/1999 Everett ..... 455/406
5,883,582 A 3/1999 Bowers et al. ..... 340/825.54
5,886,634 A 3/1999 Muhme ..... 340/572
5,887,176 A 3/1999 Griffith et al. ..... 395/750
5,889,474 A 3/1999 LaDue ..... 340/825.49
5,892,441 A 4/1999 Woolley et al. ..... 340/539
5,894,266 A 4/1999 Wood, Jr. et al. ..... 340/539
5,902,984 A 5/1999 Planke ..... 235/381
5,902,991 A 5/1999 Kumar ..... 235/492
5,905,653 A 5/1999 Higham et al. ..... 364/479.14
5,906,228 A 5/1999 Keller ..... 141/94
5,909,581 A 6/1999 Park ..... 395/712
5,910,776 A 6/1999 Black ..... 340/825.35
5,912,818 A 6/1999 McGrady et al. ..... 364/479.02
5,923,001 A 7/1999 Morris et al. ..... 177/245
5,923,300 A 7/1999 Mejia ..... 343/788
5,927,540 A 7/1999 Godlewski ..... 221/2
5,929,779 A 7/1999 MacLellan et al. ..... 340/825.54
5,929,801 A 7/1999 Aslanidis et al. ..... 342/44
5,930,145 A 7/1999 Yuyama et al. ..... 364/479.01
5,930,766 A 7/1999 Gibb ..... 705/15
5,936,527 A 8/1999 Isaacman et al. ..... 340/572.1
5,949,335 A 9/1999 Maynard ..... 340/572.1
5,950,630 A 9/1999 Portwood et al. ..... 128/897
5,955,298 A 9/1999 Thomashow et al. ..... 435/69.1
5,955,950 A 9/1999 Gallagher, III et al. ... 340/572.1
5,955,951 A 9/1999 Wischerop et al. ..... 340/572.8
5,959,531 A 9/1999 Gallagher, III et al. ... 340/572.1
5,959,568 A 9/1999 Woolley ..... 342/42
5,960,048 A 9/1999 Haartsen ..... 375/366
5,963,134 A 10/1999 Bowers et al. ..... 340/572.1
5,963,144 A 10/1999 Kruest ..... 340/825.54
5,969,606 A 10/1999 Reber et al. ..... 340/540
5,971,277 A 10/1999 Cragun et al. ..... 235/462.01
5,974,454 A 10/1999 Apfel et al. ..... 709/221
5,977,875 A 11/1999 Lin et al. ..... 340/570
5,979,941 A 11/1999 Mosher, Jr. et al. ..... 283/67
5,986,570 A 11/1999 Black et al. ..... 340/825.54
5,990,794 A 11/1999 Alicot et al. ..... 340/573.1
5,993,046 A 11/1999 McGrady et al. ..... 364/479.01
5,995,019 A 11/1999 Chieu et al. ..... 340/825.54
5,995,898 A 11/1999 Tuttle ..... 701/102
5,999,091 A 12/1999 Wortham ..... 340/431
5,999,741 A 12/1999 May et al. ..... 395/712
5,999,808 A 12/1999 LaDue ..... 455/412
6,002,344 A 12/1999 Bandy et al. ..... 340/825.54
6,003,006 A 12/1999 Colella et al. ..... 705/2
6,006,034 A 12/1999 Heath et al. ..... 395/712
6,009,274 A 12/1999 Fletcher et al. ..... 395/712
6,011,243 A 1/2000 Arnold et al. ..... 291/506
6,011,999 A 1/2000 Holmes ..... 700/231
6,012,041 A 1/2000 Brewer et al. ..... 705/28
6,020,856 A 2/2000 Alicot ..... 343/742
6,021,392 A 2/2000 Lester et al. ..... 705/2
6,023,225 A 2/2000 Boley et al.
6,023,610 A 2/2000 Wood, Jr. ..... 455/101
6,025,780 A 2/2000 Bowers et al. ..... 340/572.3
6,031,459 A 2/2000 Lake ..... 340/572.8
6,034,603 A 3/2000 Steeves ..... 340/572.1
6,036,099 A 3/2000 Leighton ..... 235/488
6,037,879 A 3/2000 Tuttle ..... 340/825.54
6,039,467 A 3/2000 Holmes ..... 364/479.01
6,040,773 A 3/2000 Vega et al. ..... 340/572.1
6,044,461 A 3/2000 Agha et al. ..... 713/1
6,056,199 A 5/2000 Wiklof et al. ..... 235/462.45
6,057,756 A 5/2000 Engellenner ..... 340/505
6,068,156 A 5/2000 Liff et al. ..... 221/7
6,069,564 A 5/2000 Hatano et al. ..... 340/572.7
6,070,012 A 5/2000 Eitner et al. ..... 395/712
6,070,070 A 5/2000 Ladue ..... 455/419
6,073,547 A * 6/2000 Westbrooks, Jr. .... A47J 39/003
165/48.1
6,075,441 A 6/2000 Maloney ..... 340/568.1
6,078,258 A 6/2000 Auerbach et al.
6,088,431 A 7/2000 LaDue ..... 379/114
6,097,306 A 8/2000 Leon et al. ..... 340/825.1
6,102,162 A 8/2000 Teicher
6,107,917 A 8/2000 Carrender et al. ..... 340/505
6,108,588 A 8/2000 McGrady ..... 700/231
6,112,152 A 8/2000 Tuttle ..... 701/115
6,112,502 A 9/2000 Frederick et al. ..... 53/411
6,116,461 A 9/2000 Broadfield et al. ..... 221/98
6,121,583 A 9/2000 Hansen ..... 219/401
6,121,880 A 9/2000 Scott et al. ..... 340/572.5
6,127,928 A 10/2000 Issacman et al. ..... 340/572.1
6,127,981 A 10/2000 Pritchett et al. ..... 343/711
6,131,399 A * 10/2000 Hall ..... 62/127
6,131,812 A 10/2000 Schneider ..... 235/385
6,133,835 A 10/2000 De Leeuw et al. ..... 340/572.5
6,144,848 A 11/2000 Walsh et al. ..... 455/419
6,144,859 A 11/2000 LaDue ..... 455/511
6,147,601 A 11/2000 Sandelman et al. ..... 340/506
6,147,655 A 11/2000 Roesner ..... 343/741
6,147,662 A 11/2000 Grabau et al. ..... 343/895
6,150,948 A 11/2000 Watkins
6,151,536 A 11/2000 Arnold et al. ..... 700/237
6,152,364 A 11/2000 Schoonen et al. ..... 235/375
6,152,365 A 11/2000 Kolls ..... 235/381
6,154,790 A 11/2000 Pruett et al. ..... 710/15
6,160,477 A 12/2000 Sandelman et al. ..... 340/506
6,169,483 B1 1/2001 Ghaffari et al. ..... 340/572.3
6,170,285 B1 1/2001 Huffman et al. ..... 62/448
6,185,198 B1 2/2001 LaDue ..... 370/329
6,195,005 B1 2/2001 Maloney
6,202,925 B1 3/2001 Machii et al. ..... 235/380
6,204,764 B1 3/2001 Maloney ..... 340/568.1
6,211,782 B1 4/2001 Sandelman et al. ..... 340/506
6,218,942 B1 4/2001 Vega et al. ..... 340/572.1
6,223,984 B1 5/2001 Renner et al. ..... 235/380
6,229,443 B1 5/2001 Roesner ..... 340/572.1
6,249,227 B1 6/2001 Brady et al. ..... 340/572.1
6,260,049 B1 7/2001 Fitzgerald et al. ..... 707/104
6,265,976 B1 7/2001 Roesner ..... 340/572.4
6,272,394 B1 8/2001 Lipps ..... 700/231
6,285,868 B1 9/2001 LaDue ..... 455/410
6,294,999 B1 9/2001 Yarin et al.
6,296,148 B1 10/2001 Myers et al.
6,305,609 B1 10/2001 Melzer et al. ..... 235/487
6,313,747 B2 11/2001 Imaichi et al. ..... 340/572.5
6,327,576 B1 12/2001 Ogasawara ..... 705/22
6,338,007 B1 1/2002 Broadfield et al. ..... 700/231
6,339,732 B1 1/2002 Phoon et al. ..... 700/237
6,351,215 B2 2/2002 Rodgers et al. ..... 340/572.1
6,356,197 B1 3/2002 Patterson et al. ..... 340/572.1
6,362,737 B1 3/2002 Rodgers et al. ..... 340/572.1
6,366,205 B1 4/2002 Sutphen
6,375,780 B1 4/2002 Tuttle et al. ..... 156/226
6,380,858 B1 4/2002 Yarin et al.
6,385,505 B1 5/2002 Lipps ..... 700/231
6,392,543 B2 5/2002 Maloney ..... 340/568.1
6,392,544 B1 5/2002 Collins et al.
6,393,339 B1 5/2002 Yeadon ..... 700/237
6,407,665 B2 6/2002 Maloney ..... 340/568.1
6,407,669 B1 6/2002 Brown et al. ..... 340/572.1
6,424,260 B2 7/2002 Maloney ..... 340/568.1
6,424,262 B2 7/2002 Garber et al. ..... 340/572.3
6,427,913 B1 8/2002 Maloney ..... 235/383
6,431,438 B1 8/2002 Pires et al. ..... 235/375
6,445,297 B1 9/2002 Nicholson ..... 340/572.7
6,451,154 B1 9/2002 Grabau et al. ..... 156/300
6,462,661 B2 10/2002 Pfeiffer et al. ..... 340/572.8
6,501,435 B1 12/2002 King et al. ..... 343/795
6,512,459 B2 1/2003 Benezech et al.
6,512,478 B1 1/2003 Chien ..... 342/357.09
6,517,000 B1 2/2003 McAllister et al. ..... 235/462.01
6,522,645 B1 2/2003 Lee et al. ..... 370/352
6,529,446 B1 3/2003 de la Huerga ..... 368/10
6,529,466 B2 3/2003 Saga et al.
6,532,399 B2 3/2003 Mase
6,563,425 B2 5/2003 Nicholson et al. ..... 340/572.7
6,568,596 B1 5/2003 Shaw ..... 235/426.01

(56) References Cited

U.S. PATENT DOCUMENTS 6,590,498 B2 7/2003 Helms ..... 340/572.7
6,595,418 B1 7/2003 Igarashi et al. ..... 235/385
6,600,420 B2 7/2003 Goff et al. ..... 340/572.4
6,609,047 B1 8/2003 Lipps ..... 700/231
6,609,969 B1 8/2003 Luciano et al.
6,639,509 B1 10/2003 Martinez ..... 340/10.4
6,639,514 B1 10/2003 Müller ..... 340/572.5
6,640,159 B2 10/2003 Holmes et al. ..... 700/244
6,664,895 B2 12/2003 Zhu ..... 340/570
6,677,852 B1 1/2004 Landt ..... 340/10.1
6,677,857 B2 1/2004 Bara et al.
6,686,830 B1 2/2004 Schirtzer ..... 340/10.2
6,687,609 B2 2/2004 Hsiao et al.
6,693,539 B2 2/2004 Bowers et al.
6,700,491 B2 3/2004 Shafer ..... 340/572.7
6,707,381 B1 3/2004 Maloney ..... 340/568.1
6,714,121 B1 3/2004 Moore ..... 340/10.3
6,717,154 B2 4/2004 Black et al. ..... 250/393
6,758,802 B2 7/2004 Fitzgerald et al. ..... 493/476
6,760,643 B2 7/2004 Lipps ..... 700/231
6,761,637 B2 7/2004 Weston et al. ..... 463/42
6,768,419 B2 7/2004 Garber et al. ..... 340/572.4
6,771,766 B1 8/2004 Shafiee et al. ..... 379/265.09
6,793,127 B2 9/2004 Alsafadi et al. ..... 235/375
6,812,824 B1 11/2004 Goldinger et al. ..... 340/10.1
6,814,254 B2 * 11/2004 Liff ..... G06F 19/3462 221/13
6,819,222 B2 11/2004 Lin et al.
6,829,520 B1 12/2004 Green
6,830,181 B1 12/2004 Bennett ..... 235/440
6,836,215 B1 12/2004 Laurash et al. ..... 340/572.1
6,838,989 B1 1/2005 Mays et al. ..... 340/572.1
6,839,604 B2 1/2005 Godfrey et al. ..... 700/116
6,843,720 B2 1/2005 Luciano et al.
6,859,757 B2 2/2005 Muehl et al. ..... 702/184
6,883,710 B2 4/2005 Chung ..... 235/385
6,892,520 B2 5/2005 Rowse et al. ..... 56/377
6,892,545 B2 5/2005 Ishikawa et al. ..... 62/126
6,908,034 B2 6/2005 Alleshouse ..... 235/432
6,909,326 B2 6/2005 Jesme ..... 330/251
6,970,141 B2 11/2005 Copeland et al. ..... 343/866
6,975,834 B1 12/2005 Forster ..... 455/2.72
6,982,640 B2 1/2006 Lindsay et al. ..... 340/540
6,987,392 B1 1/2006 Hernandez et al. ..... 324/627
6,989,749 B2 1/2006 Mohr ..... 340/572.1
6,989,796 B2 1/2006 Rahim
7,009,515 B2 3/2006 Carrender ..... 340/572.1
7,020,680 B2 * 3/2006 Defosse ..... 709/201
7,031,803 B2 4/2006 Eneau et al.
7,053,775 B2 5/2006 Moore ..... 340/572.1
7,181,501 B2 2/2007 Defosse
7,250,865 B2 7/2007 Maloney ..... 340/572.1
7,258,276 B2 8/2007 Linton et al.
7,268,742 B2 9/2007 Rahim
7,276,675 B2 * 10/2007 Faries, Jr. ..... A61M 5/445 219/385
7,293,705 B2 * 11/2007 Linton et al. ..... 235/385
7,315,247 B2 1/2008 Jung et al.
7,389,916 B2 6/2008 Chirnomas
7,455,225 B1 11/2008 Hadfield et al.
7,463,947 B1 * 12/2008 Frederick ..... G06F 19/327 700/231
8,423,180 B1 * 4/2013 Frederick ..... G06Q 10/087 700/236
2001/0000019 A1 3/2001 Bowers et al. ..... 340/572.1
2001/0002448 A1 5/2001 Wilson et al. ..... 700/233
2001/0011341 A1 8/2001 Hayes JR. et al. ..... 712/11
2001/0028308 A1 10/2001 De La Huerga ..... 340/573.1
2001/0034259 A1 10/2001 Luciano et al. ..... 463/16
2001/0034613 A1 10/2001 Rubsamen ..... 705/2
2001/0044731 A1 11/2001 Coffman et al. ..... 705/3
2001/0044804 A1 11/2001 Fitzgerald et al. ..... 707/200
2001/0045893 A1 11/2001 Swartzel et al. ..... 340/572.1
2001/0045894 A1 11/2001 Slavin et al.
2001/0053980 A1 12/2001 Suliman, Jr. et al. ..... 705/1
2002/0005774 A1 1/2002 Rudolph et al.
2002/0011967 A1 1/2002 Goff et al. ..... 343/895
2002/0013077 A1 1/2002 Lepine et al. ..... 439/191
2002/0027507 A1 3/2002 Yarin et al. ..... 340/573.1
2002/0038167 A1 3/2002 Chirnomas ..... 700/231
2002/0040968 A1 4/2002 Black et al. ..... 250/393
2002/0041234 A1 4/2002 Kuzma et al. ..... 340/572.8
2002/0063622 A1 5/2002 Armstrong et al. ..... 340/10.31
2002/0113082 A1 8/2002 Leatherman et al.
2002/0130778 A1 9/2002 Nicholson
2002/0130788 A1 9/2002 Chang
2002/0140966 A1 10/2002 Meade, II et al. ..... 358/1.15
2002/0143320 A1 10/2002 Levin
2002/0145036 A1 10/2002 Otto ..... 235/383
2002/0145520 A1 10/2002 Maloney
2002/0153411 A1 10/2002 Wan et al.
2002/0167397 A1 11/2002 Eroglu et al. ..... 340/10.6
2002/0180588 A1 12/2002 Erickson et al. ..... 340/10.2
2002/0183882 A1 12/2002 Dearing et al. ..... 700/115
2002/0190871 A1 12/2002 Stanfield et al.
2002/0196126 A1 12/2002 Eisenberg et al. ..... 340/10.2
2002/0198795 A1 12/2002 Dorenbosch
2003/0006907 A1 1/2003 Lovegreen et al. ..... 340/870.16
2003/0030539 A1 2/2003 McGarry et al.
2003/0034390 A1 2/2003 Linton et al. ..... 235/382
2003/0052783 A1 3/2003 Sitzman ..... 340/572.7
2003/0074106 A1 4/2003 Butler
2003/0117281 A1 6/2003 Sriharto et al. ..... 340/568.1
2003/0171998 A1 9/2003 Pujar et al. ..... 705/26
2003/0174046 A1 9/2003 Abrams ..... 340/5.92
2003/0209601 A1 11/2003 Chung ..... 235/385
2003/0216969 A1 11/2003 Bauer et al. ..... 705/22
2004/0069850 A1 4/2004 De Wilde ..... 235/385
2004/0100415 A1 5/2004 Veitch et al. ..... 343/850
2004/0124988 A1 7/2004 Leonard et al. ..... 340/612
2004/0212542 A1 10/2004 Rahim
2004/0222298 A1 11/2004 Dearing et al.
2004/0232230 A1 11/2004 Linton et al.
2004/0232231 A1 11/2004 Linton et al.
2004/0263316 A1 12/2004 Dix et al. ..... 340/5.23
2005/0008376 A1 1/2005 Parry et al. ..... 399/24
2005/0009122 A1 1/2005 Whelan et al. ..... 435/7.32
2005/0040952 A1 2/2005 Dearing et al.
2005/0088305 A1 4/2005 Greene et al.
2005/0113138 A1 5/2005 Mendolia et al. ..... 455/558
2005/0125312 A1 6/2005 Dearing et al.
2005/0127177 A1 6/2005 Dearing et al.
2005/0194437 A1 9/2005 Dearing et al.
2005/0247782 A1 11/2005 Ambartsoumian ..... 235/385
2006/0006999 A1 1/2006 Walczyk et al. ..... 340/539.27
2006/0017634 A1 1/2006 Meissner ..... 343/742
2006/0022827 A1 2/2006 Higham ..... 340/572.1
2006/0081705 A1 4/2006 Linton et al.
2006/0190628 A1 8/2006 Linton et al.
2006/0214864 A1 9/2006 Rahim
2006/0244599 A1 11/2006 Taylor et al.
2006/0289650 A1 12/2006 Taylor et al.
2007/0069018 A1 3/2007 Dearing et al.
2007/0108273 A1 5/2007 Harper et al.
2008/0100527 A1 5/2008 Rahim
2008/0116269 A1 5/2008 Dearing et al.
2008/0135613 A1 6/2008 Dearing et al.
2008/0224875 A1 9/2008 Phillips et al.
2010/0116885 A1 5/2010 Dearing et al.
2010/0187307 A1 7/2010 Phillips et al.

FOREIGN PATENT DOCUMENTS

CN 1230270 9/1999
DE 299 12 346 U1 12/1999
EP 0 632 288 1/1995
EP 0 722 590 B1 7/1996
EP 0726545 8/1996
EP 1679636 7/2006
EP 1701296 9/2006
FR 2786876 6/2000
GB 232252 A * 10/1925 ..... B01L 3/0282
GB 2323252 9/1998
GB 2 333 095 A 7/1999

(56) References Cited

FOREIGN PATENT DOCUMENTS

| | | | |
|---|---|---|---|
| JP | 51-122498 | | 10/1976 |
| JP | 4185397 | | 7/1992 |
| JP | 07-230584 | | 8/1995 |
| JP | H07-302284 | | 11/1995 |
| JP | 10-316210 | | 12/1998 |
| JP | 11-085858 | | 3/1999 |
| JP | 11-130213 | | 5/1999 |
| JP | 11-283123 | | 10/1999 |
| JP | H11-283123 | | 10/1999 |
| JP | 2000-038202 | | 2/2000 |
| JP | 2000-137758 | | 5/2000 |
| JP | 2000128315 | | 5/2000 |
| JP | 2000-251156 | | 9/2000 |
| JP | 2000-276335 | | 10/2000 |
| JP | 2000-310476 | | 11/2000 |
| JP | 2001-052054 | | 2/2001 |
| JP | 2001-097512 | | 4/2001 |
| JP | 2001-160162 | | 6/2001 |
| JP | 2001-229263 | | 8/2001 |
| JP | 2001-240217 | | 9/2001 |
| JP | 2001-317859 | | 11/2001 |
| JP | 2001-317862 | | 11/2001 |
| JP | 2002-032865 | | 1/2002 |
| JP | 2006-56244 | | 2/2002 |
| KR | 1993-0005285 | | 3/1993 |
| KR | 1996-0002892 | Y1 | 4/1996 |
| KR | 10-0184972 | B1 | 5/1999 |
| KR | 2001-0022226 | | 3/2001 |
| KR | 2001-0022227 | | 3/2001 |
| KR | 2001-0072457 | | 7/2001 |
| KR | 10-0766679 | | 10/2007 |
| RU | 2 161 329 | C2 | 12/2000 |
| RU | 2 168 761 | C1 | 6/2001 |
| WO | WO 95/25423 | | 9/1995 |
| WO | WO 96/12254 | | 4/1996 |
| WO | WO 97/24689 | | 7/1997 |
| WO | WO 97/29729 | | 8/1997 |
| WO | WO 98/26746 | | 6/1998 |
| WO | WO 98/52168 | | 11/1998 |
| WO | WO 99/05659 | | 2/1999 |
| WO | WO 99/05660 | | 2/1999 |
| WO | WO 99/12122 | | 3/1999 |
| WO | WO 99/45493 | | 9/1999 |
| WO | WO 99/45494 | | 9/1999 |
| WO | WO 99/45495 | | 9/1999 |
| WO | WO 99/46940 | | 9/1999 |
| WO | WO 99/49337 | | 9/1999 |
| WO | W0 99/52723 | | 10/1999 |
| WO | WO 99/57837 | | 11/1999 |
| WO | WO 99/60512 | | 11/1999 |
| WO | WO 99/62196 | | 12/1999 |
| WO | WO 99/67735 | | 12/1999 |
| WO | WO 00/03352 | | 1/2000 |
| WO | WO 00/04485 | | 1/2000 |
| WO | WO 00/04520 | | 1/2000 |
| WO | WO 00/45324 | | 8/2000 |
| WO | WO 01/55931 | A1 | 8/2001 |
| WO | WO 01/64016 | A1 | 12/2001 |
| WO | WO 01/95243 | A2 | 12/2001 |
| WO | WO 02/01467 | A2 | 1/2002 |
| WO | WO 02/03230 | A1 | 1/2002 |
| WO | WO 02/08939 | | 1/2002 |
| WO | WO 02/19251 | | 3/2002 |
| WO | WO 02/31629 | | 4/2002 |
| WO | WO 02/33511 | | 4/2002 |
| WO | WO 02/35432 | A1 | 5/2002 |
| WO | WO 03/026724 | A1 | 4/2003 |
| WO | WO 03/073201 | | 9/2003 |
| WO | WO 03/073225 | A2 | 9/2003 |
| WO | WO 03/087868 | A2 | 10/2003 |
| WO | WO 2005/013496 | | 2/2005 |
| WO | WO 2007/142645 | | 12/2007 |
| WO | WO 2008/115784 | | 9/2008 |

OTHER PUBLICATIONS

"A Transponder IC for Wireless Identification Systems", Wu et al., Seventh IEEE International Symposium on Personal, Indoor and Mobile Radio Communications, Oct. 1996 (4 pages).
"An Analysis of Automatic Identification Technology Applications in Naval Logistics", Watt et al, Thesis submitted to Postgraduate School, Mar. 1997 (132 pages).
"Passive Wearable Electrostatic Tags", Nivi, B., Master's Thesis—MIT, Sep. 1997 (56 pages).
"Applications of RFID Technology", Raza et al., IEE Colloquium on RFID Technoogy, 1999 (5 pages).
"Magic Medicine Cabinet: A Situated Portal for Consumer Healthcare", Wan, D., Proceedings of the International Symposium on Handheld and Ubiquitous Computing, 1999 (4 pages).
"User's Guide on Controlling Locks, Keys and Access Cards,", Elkins et al., User's Guide UG-2040-SHR, Jul. 2000 (110 pages).
Nov. 28, 2008 Official Action in Australian Patent Appln. No. 2006220406.
Declaration of Edward W. Burnham dated May 12, 2003. Oct. 20, 2003 International Search Report.
Rosen, Cheryl, "The Fast Track," InformationWeek.Com, Jun. 18, 2001.
Woodyard, Chris, "Chips to Improve Baggage-Check Efficiency," Nov. 27, 2000, USA Today, Gannett Co., Inc.
Wigglesworth, Zeke, "SFO Installing First-in-U.S. Security System," San Jose Mercury News, Feb. 18, 2001.
Siedsma, Andrea, "SCS Aims to Make Skies Friendler for Air Travellers," Feb. 23, 2001.
Brakeman, Lynne, "RFID Baggage Tracking Solution Helps Keep SFIA Secure," Jul. 1, 2001.
"Mobil Speedpass Makes Gasoline Purchase Virtually Effortless", Business Wire, Feb. 19, 1997, Copyright 1997 Business Wire, Inc., Business Wire, pp. 1-2.
"Technical report for RFID systems operating in the 2.45 Ghz ISM band", Jul. 4, 1999, revised Aug. 19, 1999, pp. 1-51.
"Air Interfaces: Communications and Interfaces: Part B: Parameter Values for 2.45 Ghz Narrow Band RFID Systems", Jun. 1, 1999.
"Radio Frequency Identification System—13.56 MHz", Feb. 13, 1997, pp. 1-20.
"Comments on the joint proposal by Gemplus and Checkpoint for a universal wake-up command (at 13.56MHz)", Alain Berthon, Texas Instruments, May 17, 2000, pp. 1-3.
"Field Re-programmable Item Management Air Interface Standard Proposal for 13,56 MHz," GEMPLUS 13 MHZ Air Interface Proposal, ISO/SC31/WG4/SG3 GEMPLUS NP, Jun. 21, 1999.
"13.56MHz Air Interface Proposal," Checkpoint systems, Inc. and Microchip Technology, Inc., Aug. 11, 1999.
"Multiple Frequency Anti-collision Protocol," Inferneon Technologies AG, ISO/8EC JTC 1/SC31 Workung Group 4—Radio Frequency Identification for Item Management, Mar. 23, 2000.
Moore, Bert, "RFID May Yet Prove Its Mettle on Metal," Frontline Solutions, Apr. 2001.
Senger, Nancy, "Making Airlines Safer With RFID," Business Solutions, Mar. 2000.
Sharp, Kelvin, "This "Killer App" Can Save Lives," ID Systems, Feb. 2000, Inc.
Binzoni, et al., "SCS Corporation Announces Radio Frequency Identification Installation at a Major Airport.", Oct. 5, 1999.
Aug. 1, 2003, International Search Report in PCT/US02/40967.
May 20, 2005 International Preliminary Examination Report in PCT/US03/04653.
May 3, 2005 Official Action in U.S. Appl. No. 10/209,348.
Jan. 17, 2005 Canadian Official Action.
Russian Official Action in Russian Application No. 2004128075 (with English language translation).
Apr. 13, 2006 Supplementary Partial European Search Report in European Application No. 03713485.
Feb. 3, 2006 Official Action in U.S. Appl. No. 10/795,386.
Jul. 14, 2006 Supplementary European Search Report in European Application No. 03713485.5.
Jul. 14, 2005 Official Action in U.S. Appl. No. 10/795,386.

(56) References Cited

OTHER PUBLICATIONS

Jan. 28, 2005 Official Action in U.S. Appl. No. 10/795,386.
Mar. 21, 2006 Official Action in U.S. Appl. No. 10/209,348.
Aug. 15, 2006 Canadian Official Action in Canadian Patent Appln. No. 2,425,189.
Sep. 11, 2006 Australian Written Opinion with Oct. 2, 2006 Singapore communication in Singapore Patent Appln. No. 200403954-1.
Sep. 20, 2006 Communication in Russian Application No. 2004128075/09(030475) (with English-language translation).
Dec. 12, 2006 Japanese Official Action in Japanese Patent Appln. No. 2002-538343 (with partial translation).
Jan. 3, 2007 European Official Action in European Patent Appln. No. 01 919 848.7.
Feb. 15, 2007 Official Action in Korean Patent Appln. No. 7027537/2006 (with partial translation).
May 18, 2007 Official Action in Korean Patent Appln. No. 7013101/2004 (with partial translation).
Jun. 25, 2007 Official Action in Korean Patent Appln. No. 45389/2007 (with partial translation).
Jun. 25, 2007 Official Action in Korean Patent Appln. No. 45392/2007 (with partial translation).
Jun. 25, 2007 Official Action in Korean Patent Appln. No. 45394/2007 (with partial translation).
Jun. 25, 2007 Official Action in Korean Patent Appln. No. 45396/2007 (with partial translation).
Aug. 6, 2007 Official Action in Korean Patent Appln. No. 45398/2007 (with partial translation).
Jun. 22, 2007 Official Action in Japanese Patent Appln. No. 2003-571829 (with partial translation).
Aug. 22, 2007 Official Action in Mexican Patent Appln. No. PA/a/008056 (with partial translation).
Jul. 27, 2007 Official Action in Australian Patent Appln. No. 2006252255, with attached Oct. 23, 2003 International Preliminary Examination Report.
Partial Translation of Russian Decision on Grant in Russian Patent Appln. No. 2004128075.
Sep. 3, 2007 Official Action in Japanese Patent Appln. No. 2002-538343 (with partial translation).
Sep. 13, 2007 Official Action in European Patent Appln. No. 06 023 373.1.
Oct. 4, 2007 Official Action in Singapore Patent Appln. No. 200403954-1.
Nov. 22, 2006 Official Action in U.S. Appl. No. 10/870,946.
Jan. 27, 2006 Official Action in U.S. Appl. No. 10/870,938.
Nov. 23, 2004 Official Action in European Patent Appln. No. 01 979 848.7
Aug. 8, 2005 Official Action in U.S. Appl. No. 10/870,938.
Sep. 13, 2004 Supplementary Search Report in European Patent Appln. No. 01 979 848.7.
Dec. 31, 2008 First Examination Report in Indian Patent Appln. No. 969/KOLNP/2004.
Mar. 5, 2009 Canadian Official Action in Canadian Patent Appln. No. 2,425,189.
Feb. 7, 2008 Official Communication in European Patent Appln. No. 03 713 485.5-1238.
Dec. 14, 2007 Mexican Official Action translation in Mexican Patent Appln. No. PA/a/2004/008056.
Mar. 6, 2008 Mexican Official Action translation in Mexican Patent Appln. No. PA/a/2004/008056.
Dec. 24, 2007 Korean Official Action in Korean Patent Appln. No. 45392/2007 (with translation).
Dec. 27, 2007 Korean Official Action in Korean Patent Appln. No. 45396/2007 (with translation).
Dec. 24, 2007 Korean Official action in Korean Patent Appln. No. 45394/2007 (with translation).
Nov. 13, 2007 Korean Official Action in Korean Patent Appln. No. 7013101/2004 (with translation).
Dec. 24, 2007 Korean Official Action in Korean Patent Appln. No. 45389/2007 (with translation).
Feb. 11, 2008 Korean Official Action in Korean Patent Appln. No. 45398/2007 (with translation).
Oct. 11, 2007 Canadian Official Action in Canadian Patent Appln. No. 2,425,189.
Feb. 27, 2008 Korean Official Action in Korean Patent Appln. No. 45389/2007 (with translation).
Apr. 18, 2008 Korean Official Action in Korean Patent Appln. No. 7000578/2008 (with translation).
Aug. 8, 2008 Mexican Official Action translation in Mexician Patent Appln. No. PA/a/2004/008056.
Jul. 11, 2008 Japanese Official Action translation in Japanese Patent Appln. No. 2003-571829.
United States Patent Office Action for U.S. Appl. No. 12/508,758 dated Sep. 21, 2010 (9 pages).
Chinese Patent Office Action for Application No. 03804323.8 dated Sep. 6, 2010 (12 pages).
Japanese Patent Office Action for Application No. 2007-326923 dated Sep. 30, 2010 (4 pages).
Japanese Patent Office Action for Application No. 2007-326923 dated Dec. 24, 2009 (3 pages) English translation only.
United States Patent Office Action for U.S. Appl. No. 10/862,456 dated Dec. 24, 2009 (7 pages).
United States Patent Office Action for U.S. Appl. No. 12/508,758 dated Dec. 30, 2009 (19 pages).
Chinese Patent Office Action for Application No. 03804323.8 dated Mar. 1, 2010 (11 pages).
United States Patent Office Notice of Allowance for U.S. Appl. No. 11/559,231 dated May 21, 2010 (5 pages).
United States Patent Office Notice of Allowance for U.S. Appl. No. 11/381,849 dated Jun. 1, 2010 (14 pages).
Canadian Patent Office Action for Application No. 2425189 dated May 11, 2010 (3 pages).
May 22, 2009 Chinese Official Action in Chinese Patent Appln. No. 03804323.8 (with translation).
Godinez, V., "RFID tracks hospital's devices," The Dallas Morning News (Apr. 28, 2007) 3 pages.
Mobile Aspects, Inc., "Case study: expiration management—for Organization King's Daughters Medical Center," (2007) 1-2.
Mobile Aspects, Inc., "Hands free through RFID," File Aspects/Solutions/Hands Free through RFID, www.mobileaspects.com (2008) 1 page.
Mobile Aspects, Inc., "iRISite™", File Aspects/Solutions/IRISite, www.mobileaspects.com (2008) 1 page.
Mobile Aspects, Inc., "iRISMed·8", File Aspects/Solutions/IRISMed, www.mobileaspects.com (2008) 1 page.
Mobile Aspects, Inc., "iR1Supply™", File Aspects/Solutions/IRISupply, www.mobileaspects.com (2008) 1 page.
Mobile Aspects, Inc., "iRISynergy™", File Aspects/Solutions/IRISynergy, www.mobileaspects.com (2008) 1 page.
Mobile Aspects, Inc., "Supporting the needs of the surgical speciality environment automating inventory management with RFID-enabled technology" (2007) 2 pages.
Mutiple Antenna Reader System (MARS), MARS-24 (2007) 2 pages).
Nalepa, D., "Inventory management and recall capabilities with RFID technology," Cath Lab Digest, (2007) 15(3):40-42.
WinWare, Inc., "Winware releases the Accu-Cab RFID inventory management storage cabinet," Jun. 23, 2006, 1 page.
WinWare, Inc., CribMaster—AccuCab RFID, RFID Point of Use Dispensing "CribMaster Accu-Cab" brochure, 1 page.
Australian Patent Office Examination Report for Application No. 2002211769 dated Mar. 31, 2006 (2 pages).
Australian Patent Office Examination Report for Application No. 2003217534 dated Sep. 7, 2006 (2 pages).
Canadian Patent Office Action for Application No. 2,474,183 dated Sep. 25, 2009 (3 pages).
Chinese Patent Office Action for Application No. 03804323.8 dated Dec. 12, 2008 (7 pages), translation only.
Chinese Patent Office Action for Application No. 03804323.8 dated Sep. 11, 2009 (7 pages).
European Patent Office Supplementary Partial European Search Report for Application No. 03713485 dated Apr. 13, 2006 (5 pages).

(56) References Cited

OTHER PUBLICATIONS

International Preliminary Report on Patentability for Application No. PCT/US01/32230 dated Aug. 9, 2002 (4 pages).
International Search Report for Application No. PCT/US01/32230 dated Dec. 28, 2001 (3 pages).
International Search Report and Written Opinion for Application No. PCT/US2008/056981 dated Sep. 4, 2008 (9 pages).
Japanese Patent Office Action for Application No. 2007-061714, translation only (drafted Sep. 9, 2009) 4 pages).
Korean Patent Office Action for Application No. 7013101/2004 dated Nov. 21, 2006 (6 pages).
Russian Decision on Grant of Russian Patent Application No. 2004128075, translation (8 pages).
Russian Patent Office Action for Application No. 2008111640 with response due Oct. 2, 2009 (3 pages) translation only.
Singapore Patent Office Examination Report for Application No. 200403954-1 dated Jun. 26, 2008 (4 pages).
United States Patent Office Action for U.S. Appl. No. 09/981,219 dated Apr. 9, 2003 (16 pages).
United States Patent Office Action for U.S. Appl. No. 10/080,330 dated Jun. 5, 2003 (14 pages).
United States Patent Office Action for U.S. Appl. No. 10/080,330 dated May 5, 2004 (5 pages).
United States Patent Office Action for U.S. Appl. No. 10/209,348 dated Oct. 15, 2004 (8 pages).
United States Patent Office Action for U.S. App. No. 10/795,386 dated Jul. 3, 2006 ( 8 pages).
United States Patent Office Action for U.S. Appl. No. 10/795,386 dated Apr. 13, 2007 (8 pages).
United States Patent Office Action for U.S. Appl. No. 10/795,386 dated Dec. 22, 2006 (7 pages).
United States Patent Office Action for U.S. Appl. No. 10/862,456 dated Dec. 10, 2008 (8 pages).
United States Patent Office Action for U.S. Appl. No. 10/692,456 dated Jan. 22, 2008 (6 pages).
United States Patent Office Action for U.S. Appl. No. 10/862,456 dated Jul. 2, 2008 (8 pages).
United States Patent Office Action for U.S. Appl. No. 10/862,456 dated Jun. 10, 2009 (7 pages).
United States Patent Office Action for U.S. Appl. No. 10/862,456 dated Jun. 8, 2006 (11 pages).
United States Patent Office Action for U.S. Appl. No. 10/862,456 dated Mar. 14, 2007 (11 pages).
United States Patent Notice of Allowance for U.S. Appl. No. 10/870,938 dated Aug. 10, 2006 (7 pages).
United States Patent Office Action for U.S. Appl. No. 10/870,946 dated May 31, 2006 (11 pages).
United States Patent Office Action for U.S. Appl. No. 10/870,946 dated May 1, 2007 (13 pages).
United States Patent Office Action for U.S. Appl. No. 10/870,946 dated Oct. 15, 2007 (14 pages).
United States Patent Office Action for U.S. Appl. No. 10/874,264 dated Apr. 29, 2008 (7 pages).
United States Patent Office Action for U.S. Appl. No. 10/874,264 dated Aug. 15, 2006 (10 pages).
United States Patent Office Action for U.S. Appl. No. 10/874,264 dated Aug. 28, 2009 (8 pages).
United States Patent Office Action for U.S. Appl. No. 10/874,264 dated Feb. 24, 2006 (6 pages).
United States Patent Office Action for U.S. Appl. No. 10/874,264 dated Feb. 7, 2007 (9 pages).
United States Patent Office Action for U.S. Appl. No. 10/874,264 dated Jul. 12, 2007 (8 pages).
United States Patent Office Action for U.S. Appl. No. 10/874,264 dated Mar. 12, 2009 (8 pages).
United States Patent Office Action for U.S. Appl. No. 10/874,264 dated Nov. 13, 2007 (8 pages).
United States Patent Office Action for U.S. Appl. No. 10/874,264 dated Oct. 2, 2008 (8 pages).
United States Patent Office Action for U.S. Appl. No. 10/953,368 dated Jan. 8, 2008 (7 pages).
United States Patent Office Action for U.S. Appl. No. 10/953,369 dated Nov. 17, 2005 (5 pages).
United States Patent Office Action for U.S. Appl. No. 10/953,369 dated Apr. 17, 2006 (8 pages).
United States Patent Office Action for U.S. Appl. No. 10/953,369 dated Mar. 29, 2007 (5 pages).
United States Patent Office Action for U.S. Appl. No. 10/953,390 dated Jun. 1, 2006 (11 pages).
United States Patent Office Action for U.S. Appl. No. 10/953,390 dated Feb. 14, 2007 (11 pages).
United States Patent Office Action for U.S. Appl. No. 10/953,390 dated Sep. 5, 2007 (9 pages).
United States Patent Office Action for U.S. Appl. No. 10/953,390 dated Nov. 15, 2007 (7 pages).
United States Patent Notice of Allowance for U.S. Appl. No. 10/954,612 dated Mar. 10, 2006 (5 pages).
United States Patent Notice of Allowance for U.S. Appl. No. 10/954,612 dated Aug. 25, 2006 (5 pages).
United States Patent Notice of Allowance for U.S. Appl. No. 10/954,612 dated Aug. 14, 2007 (5 pages).
United States Patent Notice of Allowance for U.S. Appl. No. 10/954,612 dated Oct. 29, 2007 (5 pages).
United States Patent Office Action for U.S. Appl. No. 10/954,612 dated Dec. 11, 2007 (7 pages).
United States Patent Office Action for U.S. Appl. No. 10/954,612 dated Apr. 16, 2008 (7 pages).
United States Patent Office Action for U.S. Appl. No. 10/954,612 dated Oct. 20, 2008 (6 pages).
United States Patent Office Action for U.S. Appl. No. 11/247,253 dated Apr. 15, 2008 (8 pages).
United States Patent Office Action for U.S. Appl. No. 11/247,253 dated Dec. 31, 2007 (6 pages).
United States Patent Office Action for U.S. Appl. No. 11/247,253 dated Feb. 7, 2007 (7 pages).
United States Patent Office Action for U.S. Appl. No. 11/247,253 dated May 24, 2008 (6 pages).
United States Patent Office Action for U.S. Appl. No. 11/381,849 dated Apr. 23, 2009 (30 pages).
United States Patent Office action for U.S. Appl. No. 11/381,849 dated Aug. 4, 2009 (3 pages).
United States Patent Office Action for U.S. Appl. No. 11/381,849 dated Nov. 28, 2008 (17 pages).
United States Patent Office Action for U.S. Appl. No. 11/381,849 dated Oct. 19, 2009 (34 pages).
United States Patent Office Action for U.S. Appl. No. 11/559,231 dated Oct. 19, 2009 (17 pages).
United States Patent Office Action for U.S. Appl. No. 11/687,272 dated Apr. 17, 2009 (10 pages).
United States Patent Office Action for U.S. Appl. No. 11/979,124 dated Jun. 18, 2009 (9 pages).
Written Opinion for International Application No. PCT/US03/04653 dated Nov. 10, 2004 (4 pages).
European Patent Office Summons to Attend Oral Proceedings for Application No. 01979848.7 dated May 12, 2010 (3 pages).
United States Patent Office Action for U.S. Appl. No. 12/694,361 dated Aug. 2, 2010 (7 pages).
United States Patent Office Action for U.S. Appl. No. 10/862,456 dated Jun. 18, 2010 (8 pages).
European Patent Office Decision to Refuse and Minutes for Application No. 01979848.7 dated Dec. 1, 2010 (27 pages).
United States Patent Office Notice of Allowance for U.S. Appl. No. 12/508,758 dated Feb. 4, 2011 (4 pages).
United States Patent Office Notice of Allowance for U.S. Appl. No. 10/862,456 dated Nov. 19, 2010 (5 pages).
United States Patent Office Notice of Allowance for U.S. Appl. No. 12/694,361 dated Dec. 30, 2010 (4 pages).
United States Patent Office Action for U.S. Appl. No. 12/759,510 dated Dec. 27, 2010 (10 pages).

* cited by examiner

RF POINT OF SALE AND DELIVERY METHOD AND SYSTEM USING COMMUNICATION WITH REMOTE COMPUTER AND HAVING FEATURES TO READ A LARGE NUMBER OF RF TAGS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This application is a continuation of application Ser. No. 10/954,612 filed Oct. 1, 2004, which is a continuation of application Ser. No. 10/080,330 filed Feb. 21, 2002 (now abandoned), which is a continuation-in-part of application Ser. No. 09/981,219 filed Oct. 16, 2001, (now U.S. Pat. No. 7,258,276), which claims the benefit of U.S. Provisional Application No. 60/241,907 filed Oct. 20, 2000.

BACKGROUND OF THE INVENTION

The present invention relates to methods and systems for distributing products to customers. More particularly, the invention relates to a system that tracks the use of products using radio frequency ("RF") tags and provides information to a central computer to enable automated restocking, inventory, tracking, or reordering of the products.

A variety of paper-based, electronic, and Internet ordering systems are available and in use today. In addition, a number of inventory tracking systems, including systems that use bar coding are also in use. Beyond bar codes, it has been proposed that inventory tracking can be accomplished using RF tags. However, commercially acceptable RF systems, particularly systems that are able to track hundreds of items in relatively small areas, have not yet been developed. Furthermore, commercially acceptable integrated systems that allow consumers to order and receive goods at a location proximate to where the goods are used and that also automatically, and with limited human intervention, track usage and initiate reordering are also not available.

SUMMARY OF THE INVENTION

Accordingly, there is a need to improve the distribution and tracking of goods so that consumers experience distribution of goods at a location proximate to where the consumer will use the goods without requiring paper or computer ordering. There is also a need for a distribution system that is able to track numerous RF tagged items positioned in relatively small areas or volumes.

The invention provides a system and method where a user need only find the product of interest and take that product. As compared to most Internet-based systems and methods, the invention is "clickless." In other words, the invention requires little or no manual input from users. The invention provides a system for distributing a plurality of products. Each of the products has a radio frequency ("RF") tag. As used herein, radio frequency means electromagnetic radiation that lies between audible and infrared radiation, including microwave radiation. Each tag is encoded with a unique identifying code. In one embodiment, the system is accessed by individuals possessing a radio frequency user badge with an identifying code. Alternatively, the system could rely on magnetic swipe cards, password systems, biometric devices (such as a retinal scanner, thumb or finger print reader, voice identification unit, or the like), bar code cards, or other systems for limiting access to authorized individuals.

The system includes one or more cabinets, refrigerators, similar storage units, (generically referred to as "micro-warehouses") or even secured rooms that are stocked with the RF tagged products and accessed by individuals through one of the mechanisms described above. In one embodiment, each micro-warehouse defines an RF cavity, has a door that may be equipped with a lock (such as an electric-actuated lock), an antenna or antenna array mounted on or in the micro-warehouse, a client controller (or similar programmable device) coupled to the lock and the antenna, a badge or key reader, and an output or user-feedback device such as a light, audio device, or display. Using a signal from the badge or key reader, the client controller checks the identity of the individual accessing the micro-warehouse, such as by reading the code of the user badge. The user feedback device is then activated to indicate whether the individual attempting to access the micro-warehouse is authorized to access the unit. If the code or other identifier matches stored records of authorized users, the client controller opens the door and the user may remove desired products from the micro-warehouse. Once the user closes the door (and in some embodiments, the door is locked), the client controller performs a scan of the products remaining in the micro-warehouse to determine the identity of each of the products. The client controller then generates a message including the identity of each of the products or other message related to the products taken. That message or a second message based on the first is sent to a server. The server tracks product and user information automatically, that is, without relying on user input. The server also generates orders for products taken from the micro-warehouse by the user. The server can be programmed to automatically place those orders. This eliminates the need for the customer to re-order consumed items.

Alternatively, the system can operate like a vending machine, but with the product exit chamber, the area behind a door through which a user reaches for the product after it S has fallen from its storage area, arranged as the RF cavity. Tags on products that fall into the pick up area can be read before or as the user picks them up.

Each user badge may also include billing information and form-of-payment information in addition to having identification information. As should be apparent, billing information could take the form of the entity to be billed, which may or may not be the individual associated with the tag. Form-of-payment information may include account information, credit card information, or the like.

In one embodiment, an array of antennas is positioned within the door of each [MW] *micro-warehouse* (*"MW"*). Each antenna may have a transmission line of sight and be configured to emit a signal at one or more predefined frequencies. The antenna array generates an electromagnetic field within the MW. The products are positioned in one or more bins, compartments, or similar devices located within the MW. Preferably, the electromagnetic field is altered within the cavity defined by the micro-warehouse through the use of reflectors or devices that move the antennas within the array. In one embodiment, material that is reflective to RF signals is placed near the door/cabinet gap to prevent the escape of RF energy. This helps reduce accidental reading of tags outside the MW but near the gap, and exposure of people and things outside the MW to RF radiation.

In one preferred embodiment, tagged products are positioned such that each tag on each product is organized in an orderly fashion such that 1) the likelihood of a tag being shadowed by an RF absorbing substance within the cavity is reduced, 2) the likelihood of one tag sharing energy with another due to too close proximity is reduced, and 3) the orientation of the tags located in the fringe RF areas, and in the nulls of the cavity, increases the RF cross-section and energy absorbency of each such tag. Some of the above three desirable characteristics may be achieved by placing the tags such that they are generally orthogonal to the transmission line of sight (as opposed to being positioned generally parallel) of at least one antenna within the array. In addition, at least two of the plurality of products may be spaced a distance from each other such that energy sharing is reduced. ("Energy sharing" is a phenomenon where one or more tags positioned in close proximity share energy from an electromagnetic wave traveling through the volume such that one or more of the tags fails to receive sufficient energy to be energized and, therefore, fail to emit an identifying signal.) In one form of the invention, the distance is based on the wavelength of the signal(s) from the antenna array and is a fraction thereof. In one preferred embodiment, the distance is about 3 to about 6 cm.

It is also preferable that each tag have the ability to cloak itself for a predetermined amount of time. The amount of time may be in a range that is based on the maximum number of tags in the micro-warehouse and the temperature of the tags. In one embodiment, this time is about 1-5 seconds when the tagged products are stored at a temperature of −20° C. However, the amount of time is variable and depends on the temperature inside the MW, the tag type, the tag transmission algorithm, and the existence or not of a wake or decloak function. The cloaking time is selected to allow de-cloaking such that another scan can be done within an algorithmically acceptable time period.

A controller (often referred to as a "client controller") is coupled to the antenna array and is operable to control the antenna array such that a series of scans or runs are performed. In a preferred embodiment, the controller is operable to perform a baseline run, an inventory run, and a background run. The controller generates messages indicative of changes in the presence of tagged items within the micro-warehouse and stores those messages in a queue or buffer. The controller also calculates an integrity value, compares that value to a predetermined integrity value, and reports the comparison in the message.

As is apparent from the above, it is an advantage of the present invention to provide a method and system of inventorying and distributing products. Other features and advantages of the present invention will become apparent by consideration of the detailed description and accompanying drawings.

BRIEF DESCRIPTION OF THE DRAWINGS

In the drawings:

FIG. 2 is a schematic diagram of servers and a client device used in the system shown in FIG. 1.

DETAILED DESCRIPTION

Figure 1:
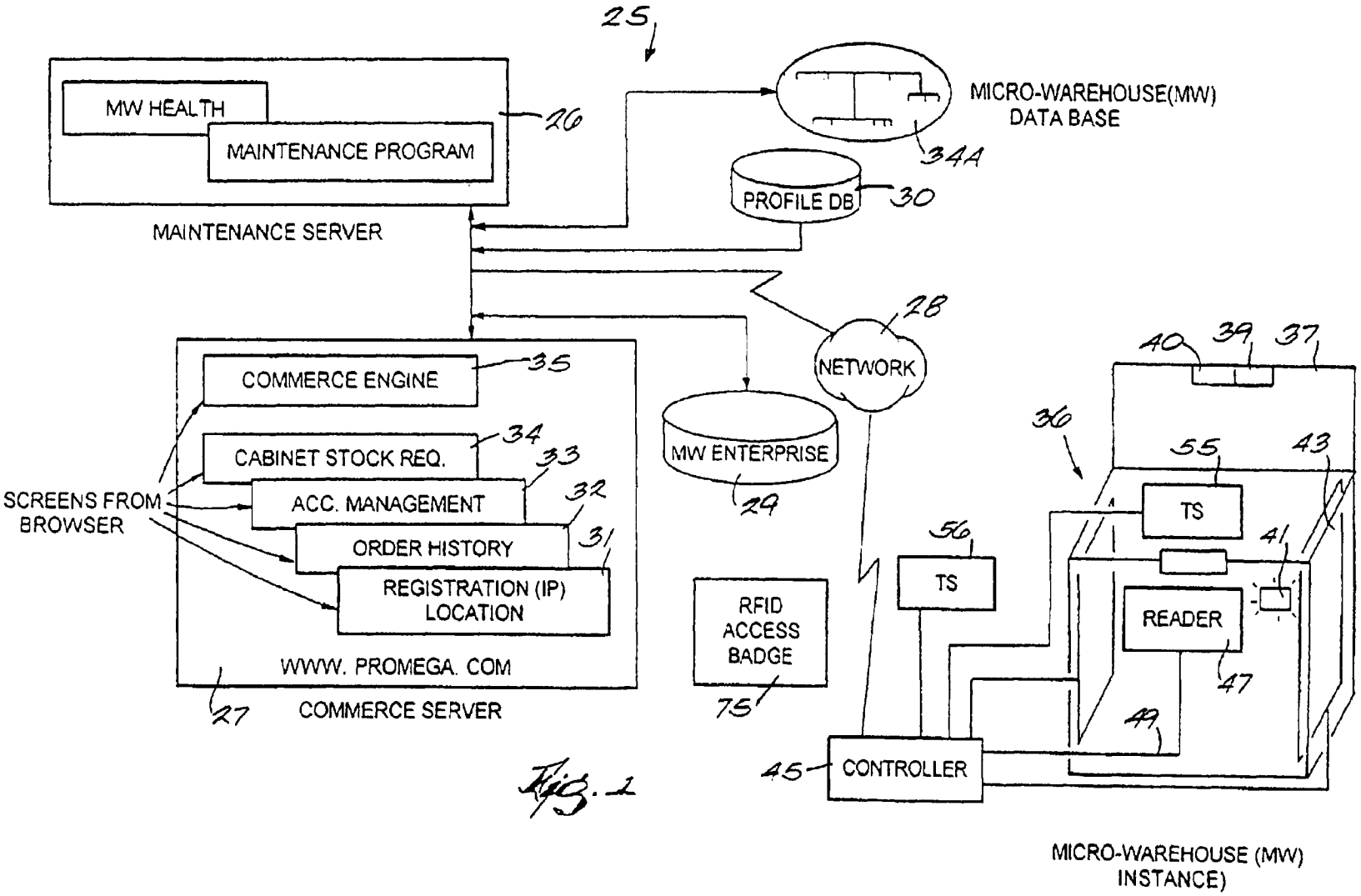
FIG. 1 is a schematic illustration of a system embodying the invention.
Figure 1:
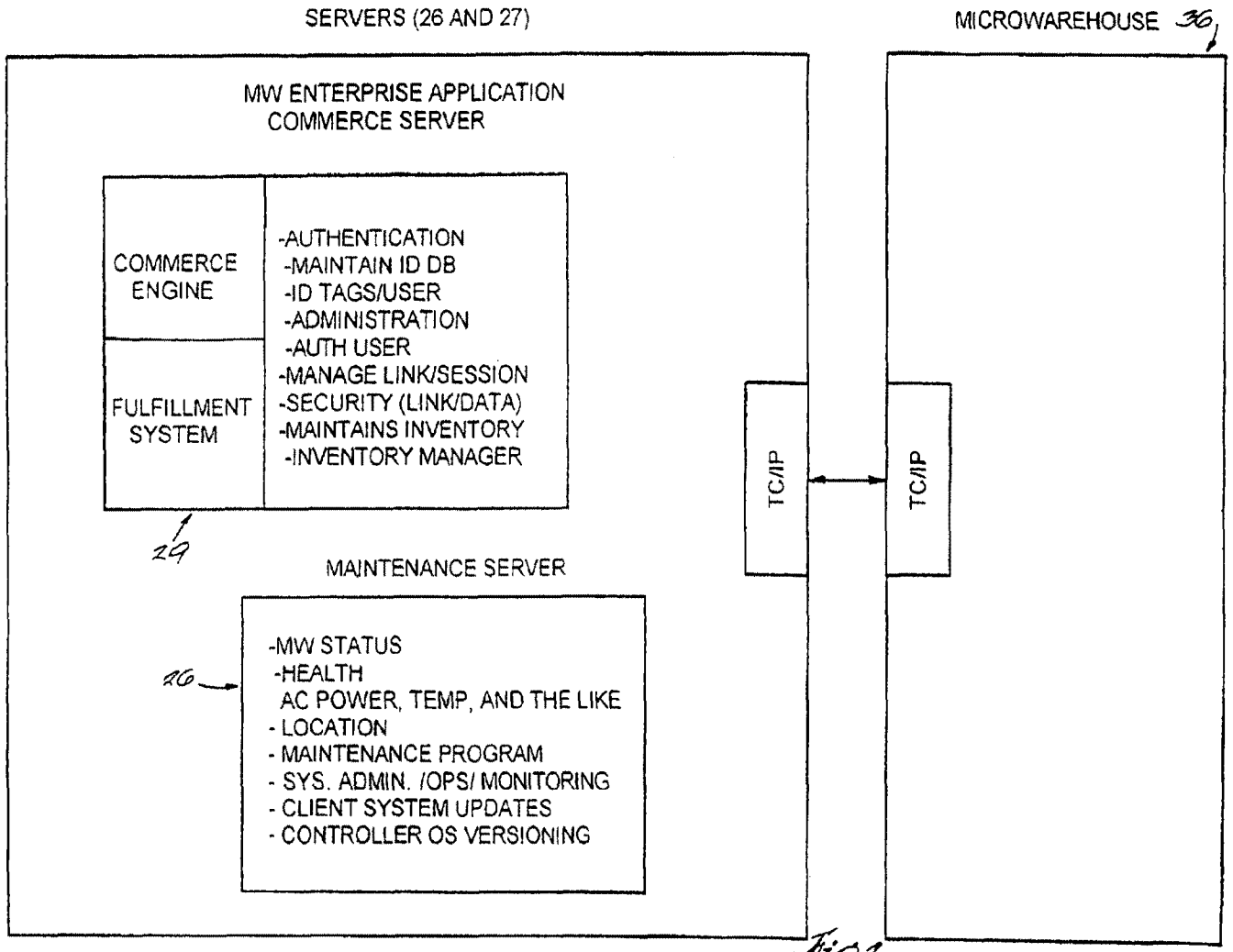

Before embodiments of the invention are explained in detail, it is to be understood that the invention is not limited in its application to the details of the construction and the arrangements of the components set forth in the following description or illustrated in the drawings. The invention is capable of still other embodiments and of being practiced or being carried out in various ways. Also, it is to be understood that the phraseology and terminology used herein is for the purpose of description and should not be regarded as limiting.

FIG. 1 illustrates an exemplary system 25 embodying the invention. The system 25 includes two servers (maintenance and commerce) 26 and 27 that create and maintain user lists, perform inventory, account, ordering functions, and monitoring functions, such as micro-warehouse status, monitoring temperature, and other faults. Servers 26 and 27 may communicate with a client (and, more particularly, a computer or similar device such as the controller in a micro-warehouse ("MW") discussed below) using standard protocols such as TCP/IP, UDP, or other protocols over a network 28. The network 28 may be the Internet, a telephone network, a wireless network, power line carrier ("PLC") network, or other type of network and combinations thereof. In the embodiment shown, servers 26 and 27 include standard hardware and operating system software (not shown). Running on top of the hardware and operating system software is a MW enterprise application 29. The MW enterprise application 29 accesses a profile database 30 that includes a registration module 31, an order history module 32, an account set-up module 33, and a stock request module 34. Each of the modules 31-34 is maintained for each client coupled to the server 27. The modules may be configured with web content designed to be accessible by a system administrator using protocols for the World Wide Web section of the Internet.

As best seen by reference to FIG. 2, the MW enterprise application 29 performs numerous functions. Broadly, the MW enterprise application 29 controls the administration of the radio frequency identification ("RFID") badges or other user badges or keys (discussed below), manages communication sessions with clients connected to the server 27, maintains an inventory of products for each client connected to the servers 26 and 27, checks inventory of MWs, and in some embodiments, other MWs local to the specific MW of interest, before ordering a product, manages security of communications, provides system administration functionality, and monitors and maintains the health of clients connected to the servers.

The registration module 31 (FIG. 1) provides part of the inventory functionality of the server 27 by providing access to information regarding the location of clients connected to the server 27. In one embodiment of the invention, the clients take the form of MWs. The registration module also provides access to information regarding sales persons assigned to a particular MW and the identification, location, and similar information for each MW. The registration module 31 may access a MW database 34A.

The order history module 32 provides a history of orders for each MW 36 and product preferences for each MW 36. The account set-up module provides administrative screens for payment authorization, user information, and similar information. The stock request module 34 controls inventory replenishment based on usage and on specific customer requests and similar information.

The server 27 also accesses a commerce engine 35 that uses information received from a client (or MW) to generate orders that are delivered to a fulfillment infrastructure (not shown). The fulfillment infrastructure produces products to be distributed using the system and method of the invention. The information may be used by a manufacturing infrastructure and marketing, customer relation management ("CRM"), billing, and other systems and functions (all not shown). For example, the invention may be used in the distribution of life science research products such as enzymes, assays, cloning vectors, competent cells, and the like. (Of course, a wide variety of non-biological products could be distributed using the invention.) The information provided by the server 27 is used in the manufacturing infrastructure to ensure proper production of products according to the demand for such products. As noted above, the server 27 may be coupled to a plurality of clients or MWs. An exemplary client in the form of the MW 36 is shown in FIG. 1. While only one client is shown, the number of clients connected to the server 27 is limited only by the server's internal capacity and the capacity of the network 28.

The MW 36 may take the form of a refrigerated cabinet, a freezer, or other storage container. A secured storeroom, similar location, or other defined area could also be outfitted with a client controller and other components, as described herein, and be used to store products. In the embodiment shown, the MW 36 includes a door 37. While it is preferred, it is not required that the MW 36 have a door. Devices (such as light curtains) that sense when access to the interior of the MW is being attempted may also be used. As noted, in another embodiment, the system may utilize a defined area to enclose the tagged products rather than a cabinet. The defined area uses an access point (not shown) to serve as its entryway. The products within the area are fitted with identification tags and specifically positioned in the area to be read by a RF inventory interrogator (such as a controller 45 and antenna array (discussed below)). Product scans begin when a sensor (such as, e.g., a proximity sensor) senses a user passing through the access point. The access point is controlled by a processor, such as the client controller 45, and is able to control doors, portals, alarms, or other mechanisms to restrict access to the area and products.

As shown, the MW 36 may also include an electric actuated lock 39, a proximity sensor 40, and a user feedback or, more generally, an output device that may take the form of an audio device or light 41. Other output devices such as a voice synthesis device, a display screen, and the like may also be used. The MW 36 is configured with an antenna array 43. The antenna array 43 is coupled to the client controller 45. In one embodiment, the invention may include an antenna array with six vertically or circularly polarized antennas. The antenna array 43 is a RF receive and transmit system that communicates with transponder devices or tags (discussed in greater detail below). In one embodiment, each tag is a passive tag and powered by energy from the antenna array 43.

The MW 36 may include a specialized badge or card reader 47 (generically a "key reader") in the form of a magnetic card swipe device, an antenna, a fingerprint reader, or similar device. The reader 47 is coupled to the client controller 45 via a communication link 49. The MW 36 may also include internal and ambient temperature sensors 55 and 56. The temperature sensors 55 and 56 are coupled to the client controller 45 to provide temperature information to the client controller. Additional information may be provided to the client controller through optional input devices. The location of the MW 36 may be monitored by a global positioning system (GPS) device (not shown) plus inertial frame recognition for fine measurement and for interpolation between GPS satellite acquisitions. Motion and shock of transport may be monitored with an accelerometer (not shown). The voltage, current, and other characteristics of electrical supply lines may be monitored and provided to the client controller 45 by a power-line-monitoring device (also not shown). The on/off duty cycle of the current supplied to the refrigeration compressor can be used, with the internal and ambient temperatures, to indicate the relative health of the compressor. Additional input devices, such as cameras, microphones, sensors, etc., could be coupled to the client controller to monitor environmental and other conditions.

A smartcard reader (not shown) may also be coupled to the controller 45. A smartcard, in addition to identifying the customer for admittance purposes, can contain a preloaded monetary equivalent that can be debited at the time of door closure for any products taken during the door open session.

The client controller 45 includes software to carry out several functions that are discussed in greater detail below. If desired, the client controller 45 may be a consumer grade device, such as a Palm Pilot® personal digital assistant, Packet PC device, or a personal computer, modified according to the teachings herein. Depending on the hardware used, the client controller 45 may be configured with a graphical user interface ("GUT") to facilitate interaction between the system 25 and its users.

The client controller 45 includes software (discussed below) which may interrogate the RF tagged products within the MW 36. The interrogation process involves sending signals from antennas and receiving signals from passive, transponder RFID tags. Preferably, interrogation is accomplished in such a way as to eliminate or reduce interference problems that are typically associated with reading RF signals from multiple devices. The system 25 could also be implemented with active tags (not shown), although presently available active tags need to be improved so as to perform in the temperatures that the embodiments of a system for distribution of life science research products are expected to operate within and at roughly the same cost and power consumption.

Figure 3:
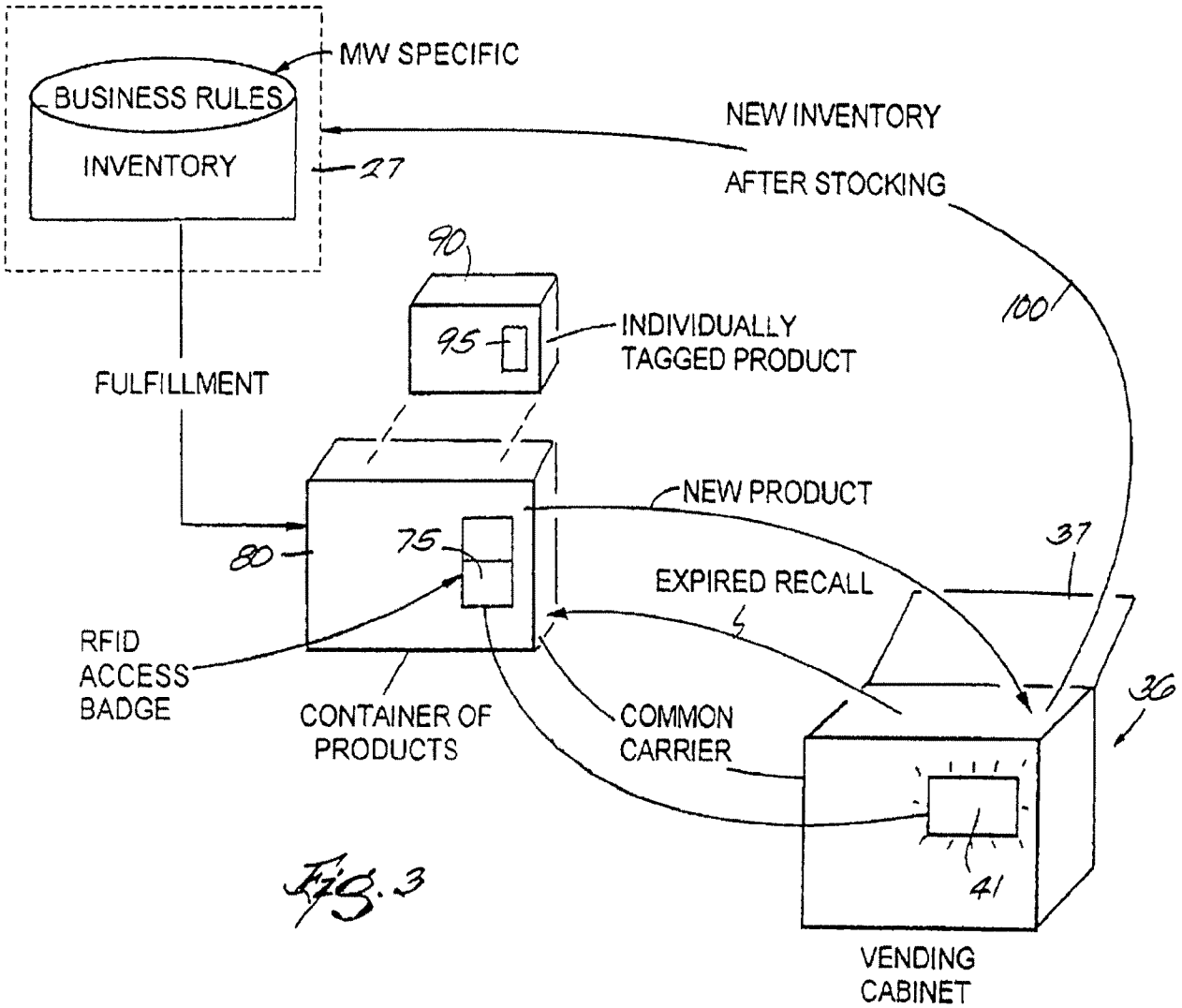
FIG. 3 is a schematic illustration of fulfillment, inventory, and other information flow among components in the system shown in FIG. 1.

In one embodiment of the system 25, one or more RFID access badges 75 (FIGS. 1 and 3) are be generated Preferably, the RFID badges 75, as well as the other RFID tags (discussed below) are passive transponder tags. Preferably, the RFID badges 75 are encoded with unique identifying information from the account set-up module 33 based on digital signatures. In addition, it is preferred that the digital signatures encoded on the RFID badges 75 used by restocking services provide one-time access to a specific MW, and thereafter expire, and be disposable. One-time access badges may be set to expire after a certain amount of time or at a set time. However, the badges 75 may also take a form that can be enabled again for one-time access at the next restocking event. The RFID access badges may be fixed on a carton of products 80 (FIG. 3). Alternatively, they may be delivered separately to the facility where the MW of interest is located. Alternatively, they may be the badges of field personnel or designated on-site authorized support personnel.

As best seen by reference to FIG. 3, the carton of products 80 includes a plurality of individual products 90 each with an identification tag 95. Each identification tag 95 may be structurally the same as an RFID badge 75, but coded with different information and configured such that the digital signature on tag 95 will generally not expire. In one form of the invention, each tag 95 has a 16-bit group identification code and a 32-bit item identification code. The 16-bit group identification code may be programmed with information such as the manufacturer or distribution channel of the product. The latter allows routing of the transaction involving a product to the proper enterprise system. The 32-bit item identification code is used to provide descriptive information regarding the product such as serial number, product type, date, lot number, and similar information, or a unique ID, which corresponds to such information in a database on a server.

Once all the products 90 have been fitted with unique RFID tags 95, the products may be shipped in the carton 80 to a designated MW such as the MW 36. The carton 80 is packed according to a fulfillment request that is based on either an initial order from a customer (not shown) or MW specific business rules followed by the server 27. The carton 80 may be fitted with RFID access badge 75 or the RFID access badge 75 may be shipped separately to the location of the MW of interest. If fitted with an RFID access badge 75, the carton 80 may be shipped by a delivery service contracted to deliver the package to the MW 36. Once the carton is delivered, the recipient or user may use the RFID access badge 75 to open the door 37 of the MW 36 by passing RFID access badge 75 in front of the reader 47. Client controller 45 reads the digital signature of the RFID access badge 75 and confirms reading of the code by actuating a user feedback device such as a voice synthesis module or the light 41. Since, the server 27 provides a locally based user list to the client controller 45, the client controller 45 oversees authentication of the digital code read from the RFID access badge 75. Client controller 45 checks the authenticity of the read code by matching the code to the user list. Client controller 45 may then optionally read the temperature sensors 55 and 56 and transmit temperature information to the server 26. If used, the temperature sensors 55 and 56 are preferably read on a periodic basis, with the temperature information being transmitted to the server 26 each time the temperature is read. Client controller 45 can also be programmed to transmit temperature data if the internal temperature falls beneath or above a predetermined range. In many instances, it will be important to ensure that the temperature of the MW is within an appropriate range to store the products 90. If the temperature of the MW 36 is within an appropriate range, and the user is authenticated, the client controller 45 then actuates the lock 39 to open the door 37 (of course, the MW need not be equipped with the lock 39). If the temperature of the MW 36 is not within an appropriate range, then access to the MW 36 may be prevented by maintaining the lock 39 in a closed state. This allows a refrigeration unit (not shown) associated with the MW 36 to cool the interior space of the MW 36 to a desired temperature before ambient air is allowed into the MW 36 by opening of the door. This also provides for product 90 integrity during a power failure.

Once the door 37 opens (which may be sensed by the proximity sensor 40), or access to the interior of the MW 36 is gained, a communication session between the MW 36 and server 27, which may be segmented based on appropriate events to optimize user response and network usage, begins. Having full access to the MW 36, the employee of a carrier or logistic service (such as UPS, Airborne Express, etc.) who delivered the carton 80 now proceeds to place the individual items 90 into the MW 36. Once the carton of products 80 is empty, the delivery employee then closes the door 37, and removes the carton, if necessary. The proximity sensor 40 senses the closing of the door 37. The client controller 45 senses the status of the sensor. Preferably, the lock 39 (if used) resets automatically after being unlocked for a predetermined time, for example five (5) seconds. The user has that predetermined time to open the door. Power to the antenna array 43 is disabled once the door 37 opens. When the door 37 closes or access is prohibited, a scan of the products 90 placed within the MW 36 is performed. Upon completing the scan, the client controller 45 sends a change-in-inventory message 100 to the commerce server 27. To ensure integrity of the inventory change billed to the customer, the client controller 45 employs an integrity algorithm when the MW 36 is scanned. The algorithm is based on statistical information, historical information, and other factors including RF algorithms and delay data.

As will be explained further below, it was found, for one embodiment, that to accurately determine the number of tagged items in a MW 36 (i.e., to provide acceptable integrity in the system), it is best to scan the tagged items multiple times. Further, in the embodiment where the MW takes the form of a freezer, refrigerator, or other cabinet, achieving integrity generally requires choosing a superset of tagged items from all scans as well as noting the set that represents the majority set (over 50%) of the scans, the number of scans in non-cloaked mode (which may be an empirical number, found to be ten for the MW 36 illustrated in FIG. 6), and the number of scans in the cloaked mode (which for the same embodiment was empirically found to be three). To achieve greater system integrity (which in one embodiment is no more than one error in five-thousand tagged items), information from scans or interrogations is held on the server 27 for a predetermined amount of time (e.g., twenty-four hours). During this time, and while the subject MW is not being accessed by a customer, the controller 45 performs background inventory checks. The background inventory checks are used to increase the inventory sample population data set to statistically significant levels whose cross section corresponds to the 1 in 5000 level. Preferably, any anomalies found are sent to the server 27 where they are used to modify information held on the server 27.

The MW 36 may be accessed by a customer at the MW location using a separate RFID badge 75 (or other identifying badge or key) shipped directly to that customer. Alternatively, and as noted above, the reader 47 may be configured as a smartcard, a magnetic card swipe device, a barcode device, a fingerprint reader, or some similar device that controls access to the MW 36. Regardless of its exact configuration, the reader preferably reads the badge or key, compares the ID information contained in the key with the list of authorized users stored in the client controller 45, and if the user's key matches one of those authorized, the client controller 45 acknowledges authorization by generating an output such as by lighting the light 41. The list of authorized users is sent to the client controller 45 and updated as needed by the server 26. The server 26 may be configured with the capability to authenticate a user's key as well. Once authentication takes place, the client controller 45 then opens the door 37 allowing the customer or user to access the interior of the MW 36. The customer then removes one or more products 90 from the interior of the MW 36 and then closes the door 37. Once the door is closed, client controller 45 scans the products 90 in the MW 36 and sends an inventory message identifying the missing or added products 90 to the server 27. The server 27 compares the previous inventory prior to opening to the current inventory. From the comparison, the server 27 determines the missing or added items in the MW 36. The inventory information is then communicated to the commerce engine 35, which preferably stores the information for future use for both marketing and inventory functions. Receipts for the used products can then be sent via electronic mail or printed and shipped via regular mail to the customer at the MW location. Invoicing can also occur using other electronic and nonelectronic communication mechanisms.

The inventory message can be used for other purposes as well. For example, the inventory message includes information regarding individual products 90. Therefore, the amount of time a particular product 90 spends in any MW 36 may be recorded by the server, as well as the product's temperature history. If time is recorded, it is also possible to compare the amount of time any particular product 90 spends in a MW 36 to a shelf life or acceptable usable life for that product. Temperature history can also be stored and compared to other data. If the shelf life is passed, then an expiration message, such as a pick list, may be generated and sent to the MW 36 or an electronic mail address of a user of the system to inform the user that certain products should be removed from the MW 36 and not used. Temperature history and time sent by the MW 36 to the server 27 may also be used to calculate a "storage-degree-day" value to for each product 90 in the MW 36. This value may, in turn, be used to make an activity projection and expiry threshold for the subject products 90. The administrator of the MW 36 may then use this information to remove expired products from the MW 36.

In yet another implementation, the inventory message may be used to determine the type of products 90 in the MW 36. If any of the products present within the MW 36 are subject to a recall by the manufacturer, the MW 36 may be placed in a "lock down" condition, whereby access to the MW 36 is denied until an administrator or other authorized individual removes the recalled product or otherwise addresses the situation. In addition to its use to protect against the use of recalled products, the lock down feature is useful for controlling the distribution of potentially spoiled or degraded products and other products where exacting product specifications and quality controls are desired, such as pharmaceutical products and controlled substances.

Figure 4:
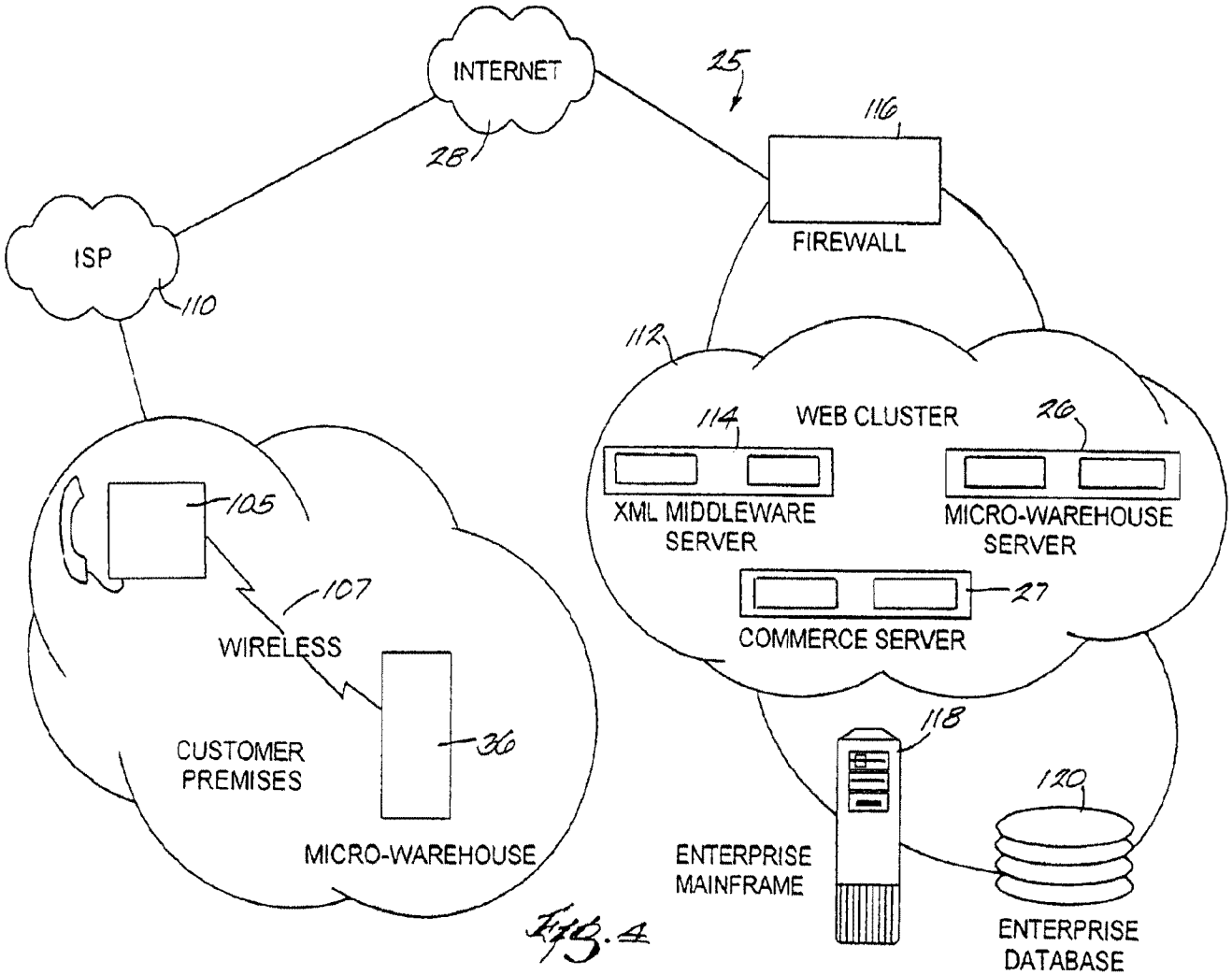
FIG. 4 is a schematic illustration of a system embodying the invention.
Figure 5:
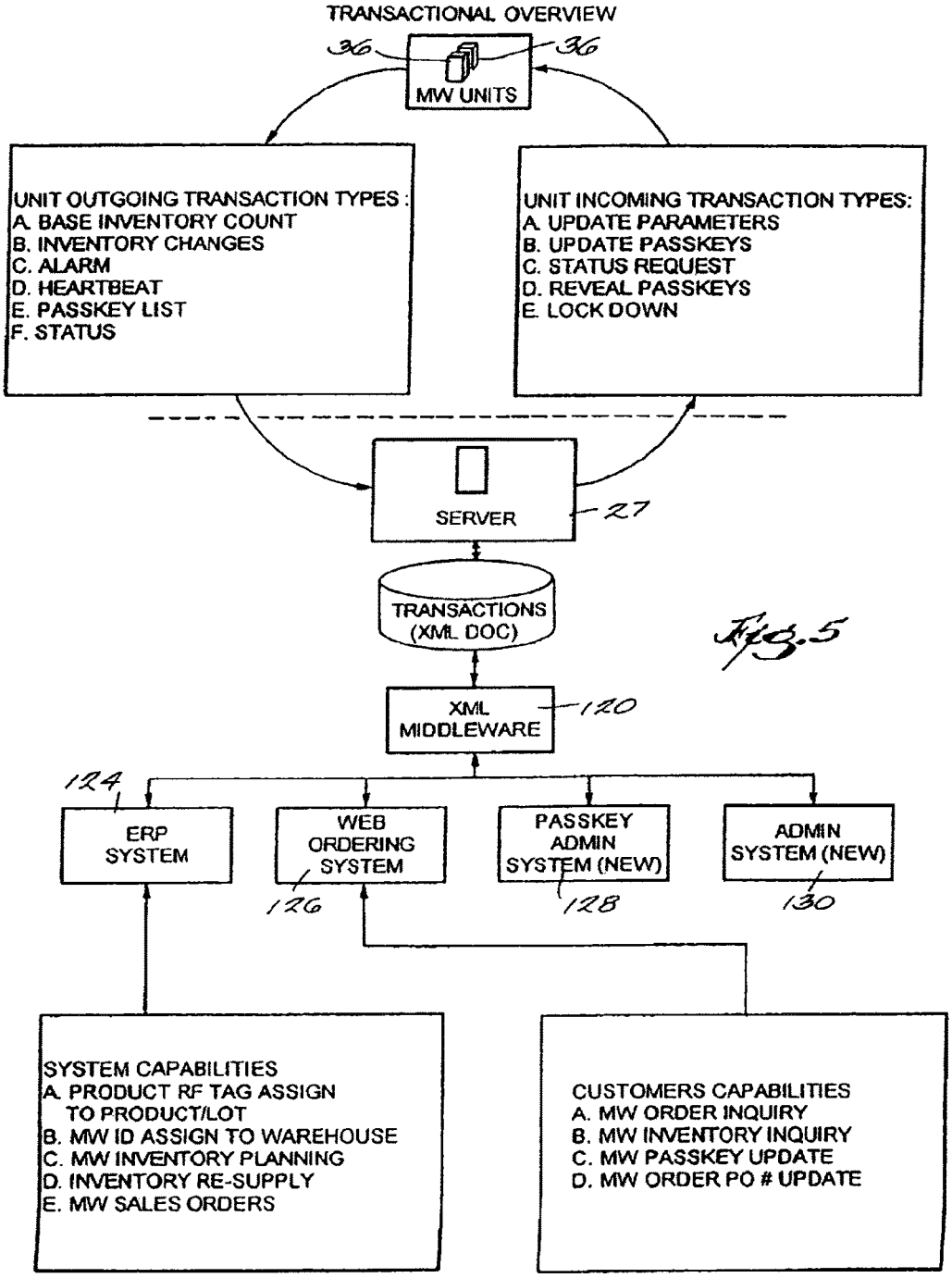
FIG. 5 is a schematic illustration of information flow among components of the system shown in FIG. 4.

FIGS. 4 and 5 illustrate additional features of the system 25. As shown in FIG. 4, the system 25 may be implemented such that the MW 36 communicates with a telephone system or similar access point 105 through a wireless communication link 107. The access point 105 may be connected to a network service provider such as an Internet service provider ("ISP") 110. The service provider 110 may provide a connection to the network 28 (which is shown as the Internet in FIG. 4). FIG. 5 provides additional details concerning the exemplary fulfillment infrastructure noted above. Servers 26 and 27 may be configured in a cluster 112 with a middleware server 114, which in one form of the invention takes the form of an extensible markup language ("XML") middleware server 114. The cluster 112 is protected by a firewall 116 and communicates with an enterprise computer 118 (such as a mainframe) which may run various enterprise resource planning ("ERP"), CRM, manufacturing, and other business process programs. The enterprise computer 118 communicates with an enterprise database 120, which is also accessible by the server 27. It should be understood that the cluster 112 may consist of any number of hardware or software servers and that the exact configuration may be modified depending on how the invention is implemented. In general, it is possible to combine functionality on one server or to separate out operations and functionality on multiple servers beyond those shown and described herein.

In the embodiment shown, information received from tagged items 90 within each MW 36 is sent to the web cluster 112, particularly the server 27, in an XML format. The XML formatted messages are transferred from the server 27 to the middleware server 114, which hosts XML middleware 120 (FIG. 5) such as Biz Talk® software. The XML software 120 communicates with other software/systems such as ERP system 124, web ordering system 126, an RFID badge, key, or passkey administration system 128, and a MW administration system 130. The ERP system 124 may be configured to assign RF tags 95 to selected products or lots of products; assign identities to each MW 36; handle inventory planning; handle re-supplying of MWs; and handle sales orders. The web ordering system 126 may be configured to process customer order inquiries; inventory inquiries; passkey updates; and purchase order updates.

Figure 6:
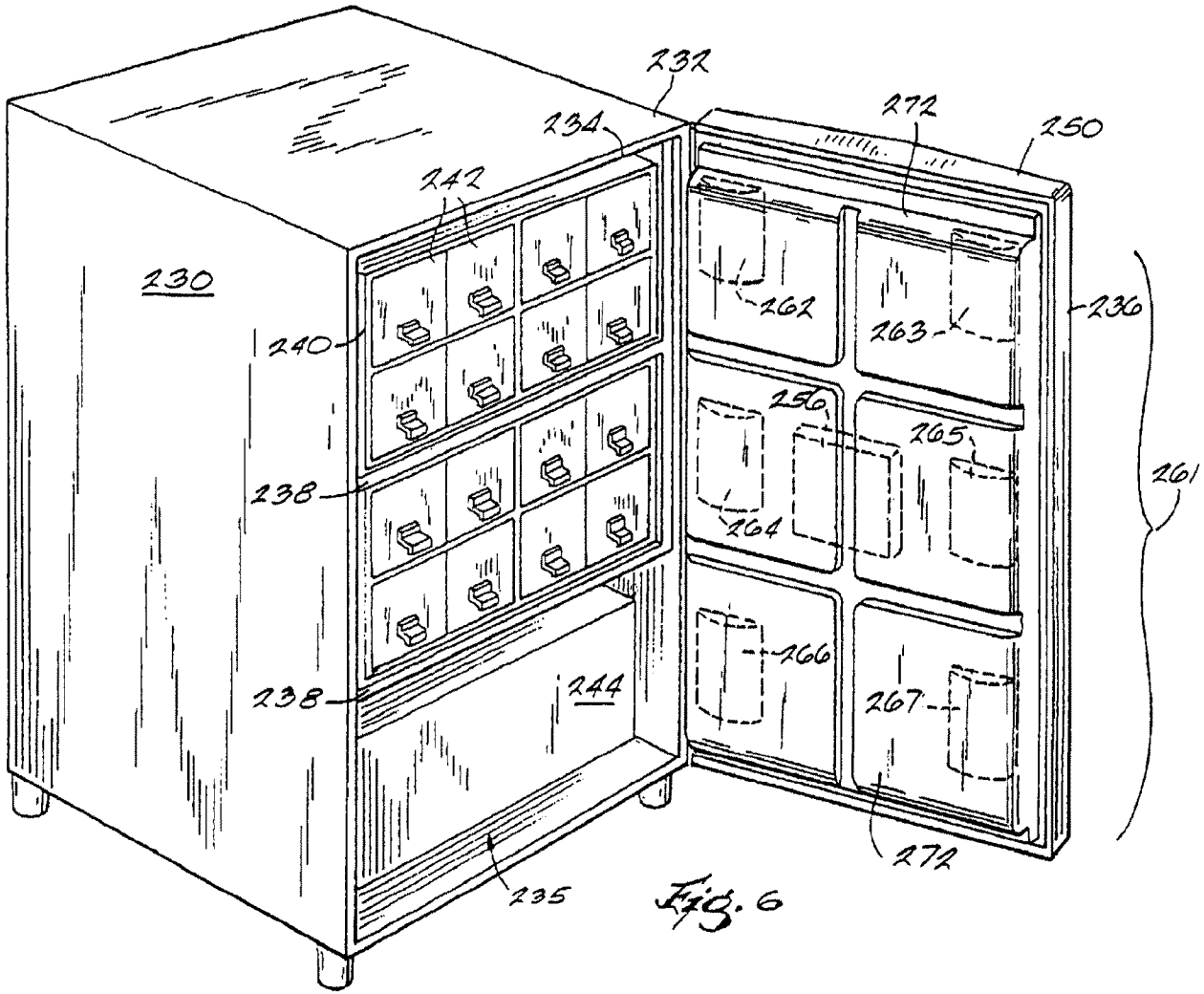
FIG. 6 is a perspective view of an exemplary micro-warehouse in the form of a freezer.

FIG. 6 illustrates an exemplary micro-warehouse in the form of a freezer 230. In the embodiment of the invention described and illustrated, components are tuned to work efficiently in a micro-warehouse having a volume of about five cubic feet (about 142 liters) and that can hold hundreds of RF tagged items. However, other embodiments are possible, including, for example, a 21 cu. ft. (about 425 liters) freezer and a 15 cu. ft. (about 595 liters) room temperature hospital supply cabinet. The freezer 230 includes a housing 232 with an opening 234 and an interior 235. A door 236 is attached to the housing 232 such that the door 236 can be closed to occlude the opening 234 and opened to provide access to the interior 235 of the freezer 232. A number of shelves 238 are positioned within the interior 235. Each shelf 238 may hold one or more cabinets 240. Each cabinet 240 may include one or more drawers 242. Each drawer 242 may hold multiple packaged products (discussed below). Products, particularly larger products, may also be positioned within a bin 244. The package dimensions of larger products often create a desirable separation of tags (which, as discussed below, reduces energy sharing).

The freezer 232 can be constructed using a standard freezer modified and equipped as described herein. For example, the door 236 may be constructed from a door provided with a standard freezer. Insulation in the standard door is removed or otherwise formed or positioned and various components needed to scan RF tags on products stored within freezer 230 (e.g., in the drawers 242 in the cabinets 240) are added. The freezer 230 may be equipped with a strip (not shown) of RF reflective material positioned around the perimeter of opening 234 to prevent or reduce the escape or leakage of RF energy.

Figure 7:
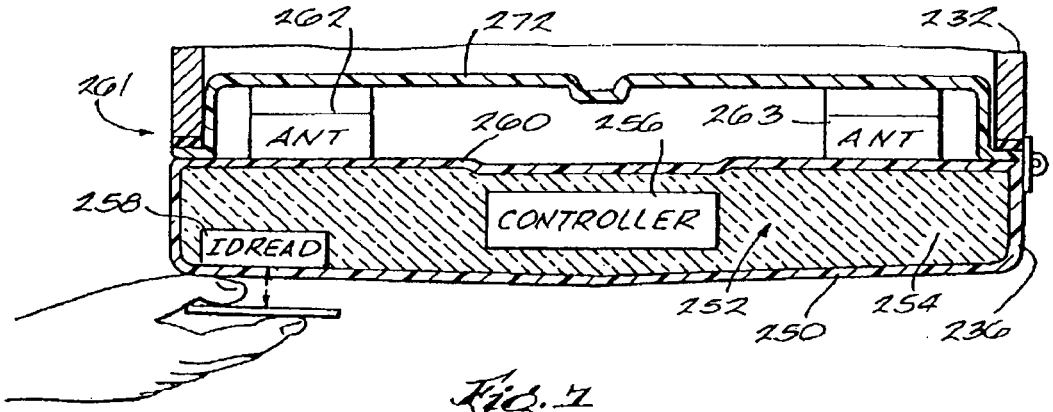
FIG. 7 is a cross-sectional view of the door of the micro-warehouse shown in FIG. 6.

As best seen by reference to FIGS. 6 and 7, the door 236 includes a front panel 250, which in one embodiment has curved sides such that a cavity or depression 252 is formed by the panel 250. Insulation 254 is positioned within the depression 252. Near the center of the panel 250 the insulation 254 is hollowed out or otherwise formed or positioned such that a controller 256 (discussed further below) may be positioned within the door 236. A second portion of the insulation 254, near one corner of the panel 250, is also hollowed out or otherwise formed or positioned such that a badge or key reader 258 or similar device may be positioned within the door 236. The insulation 254, the controller 256, and the key reader 258 are maintained within the depression 252 by a mounting plate 260. Preferably, the mounting plate 260 is made from metal. The mounting plate 260 supports an array of antennas 261. In one preferred embodiment, the array of antennas 261 includes antenna 262, antenna 263, antenna 264, antenna 265, antenna 266, and antenna 267. (FIG. 6). Although six antennas are shown, the number and positioning of the antennas within the door 236 is dependent on a variety of factors, such as antenna gain, beam shape and directionality, transmitted power, RF cavity geometry, reactivity and reflectivity, convenience of location, distance from transmitter, cost, antenna-antenna interference, effective use of antenna beam volume, prevention of RF energy escape from cavity, antenna size and shape, antenna-tag orientation, antenna multiplexing pattern, and other factors. Thus, the invention is not limited to the array shown and other arrays could be used and may be more suitable for different micro-warehouses. The array of antennas 261 can also either singly, or in some combination, be rotated through a small arc by using one or more actuators or similar devices to shift the beam interference pattern or electromagnetic field in the RF cavity, for example, to mitigate any RF nulls or shadows. The antennas may also be activated at different times and patterns to shift the beam interference pattern or alter the electromagnetic field within the RF cavity.

The presence of shelves 238, cabinets 240, drawers 242, products, and tags may affect the electromagnetic field within the freezer 230. While most of the items just mentioned are preferably made from substantially RF transparent material, they nevertheless can block or diminish the strength of RF signals. Furthermore, the tags on the products and the products themselves are not made from RF transparent material and they may block or otherwise interfere with other tags receiving RF signals. These phenomena can be variously known as shadowing. The effects of shadowing may be reduced by positioning tagged products in the cabinets 240 and drawers 242, bin 244, or in other compartments, receptacles, or devices that can help provide separation.

Figure 8:
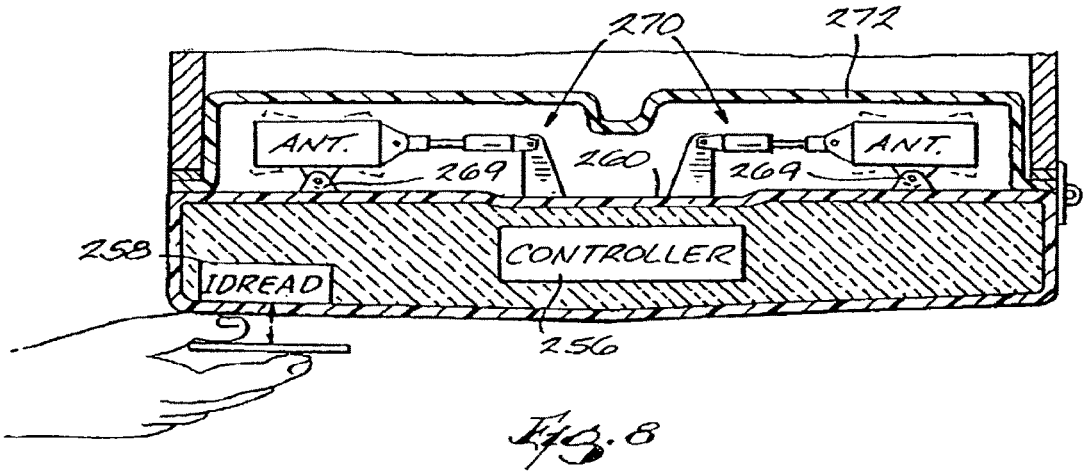
FIG. 8 is a cross-sectional view of a door of a micro-warehouse configured according to another embodiment of the invention.

The waves from each antenna and reflections off of the interior surfaces of the freezer 230 interact to create an electromagnetic field with many nulls (areas where waves combine to cancel each other such that there is insufficient energy to energize passive RF tags). The effects of nulls may be reduced by moving the field within the interior of the freezer 230 at a speed and with a pattern such that any nulls generated change position overtime. Alternatively, this can also be done by changing the geometry of one or more reflective surfaces in the RF cavity, such as with an acute sawtooth pattern, or by adjusting the power to minimize internal reflected power, or by selection or variation of antenna power and frequency. In some cases, more than one of these alternatives is used. Preferably, reflectors such as the reflector 670 (FIG. 12) are used. (As shown, the reflector 670 is positioned at the rear of the freezer 230, but other placements within the freezer are also possible.) However, actuators, pivots, and other devices could be used to move the antennas 262-267 to generate many different interference patterns and alter the position of nulls in the interior 235 such that no tag is positioned at or within a null for any significant length of time. For example, as shown in FIG. 8 the antennas 262-267 could be mounted on pivots 269 and coupled to small, electrically or pneumatically powered actuators 270 located within the cavity 252 and mounted on the mounting plate 260. Antennas suitable for use in at least some embodiments of the invention include Huber & Suhner model 2400/70/9/0/CP antennas, which are available from commercial sources. Preferably, the antennas 262-267 are protected by a RF-transparent radome 272. The radome 272 also helps position the antennas 262-267 at desired locations along the door 236. As will be discussed in greater detail below, the controller 256 sends and receives signals from the antennas 262-267. Signals transmitted by the antennas 262-267 are used to excite passive RF transponder tags 270 (FIG. 13) attached to products 272 (FIG. 13) stored within the freezer 230 or applicable MW. In preferred embodiments, the products are in the drawers 242 of the cabinets 240 or bins (when larger products are stored). Signals generated by the transponder tags 270 are received by the antennas 262-267 and processed by the controller 256.

Before discussing embodiments of the invention in greater detail, some premises of their design, particularly the designs shown in FIGS. 6 and higher, need to be addressed. First, for those embodiments implemented in a micro-warehouse, RF cavity considerations are important. Second, the particular embodiments described are designed to be compliant with Part 15 of the regulations issued by the United States Federal Communications Commission ("FCC"). Part 15 of the FCC regulations places limitations on antenna powers and frequencies that may be used in systems, such as the current one, where RF tags are scanned. In order to meet the requirements of Part 15 as well as the requirements of scanning numerous tags within a relatively small volume (or RF cavity), an antenna frequency in the GHz range (or microwave range) was chosen. In particular, the inventors discovered that a frequency of about 2.45 GHz was best suited for the applications discussed herein. Nevertheless, alternative embodiments of the invention could be configured to operate at different power ratings and frequencies (for example, MHz embodiments), as would be apparent to one of ordinary skill in the art after reviewing the designs and teachings set forth herein.

Figure 9:
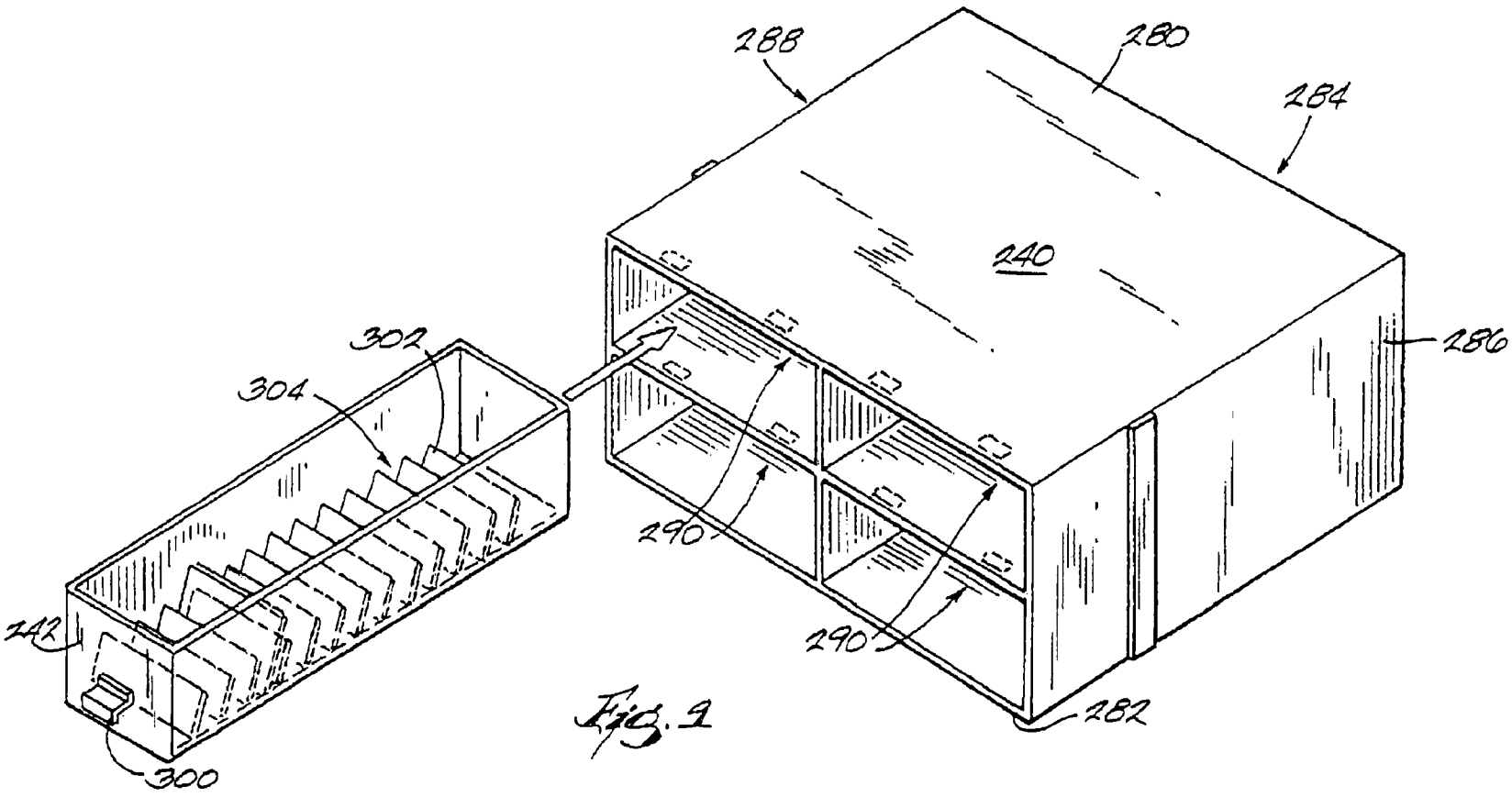
FIG. 9 is a perspective, partially phantom view of a chest capable of holding multiple drawers suitable for use in the micro-warehouse of FIG. 6 and a drawer.

FIG. 9 illustrates an exemplary cabinet 240 used in the freezer 230. The cabinet 240 includes a top 280, a bottom 282, a rear 284, and sides 286 and 288. In the embodiment shown, the cabinet 240 includes four bays 290. Each bay 290 is configured to accept a drawer 242. Each drawer includes a pull knob 300 or similar device and a plurality of angled separators 302. The angled separators 302 define a plurality of slots 304 in which packaged products 270 with RF transponder tags 272 may be positioned. The separators 302 are configured to position products within the interior 235 of the freezer 230 such that tags 272 on the products 270 contained within any one drawer 242 are maintained at a minimum separation distance and, in one embodiment, in a generally orthogonal position with respect to the transmission line of sight of the antennas located most proximate to the subject drawer 242. Orthogonal positioning is not necessary, however. The purposes of spacing tagged products include reducing energy sharing among and between proximate tags such that each tag on each product within the freezer 230 is energized at its requisite level, which for one embodiment is a minimum of about 0.23 $mW/cm^2$. In the embodiment shown, the distance between the separators 302 may be based upon the frequency of the signals from the antennas 262-267. In particular, spacing corresponding to a fraction of, and in one preferred embodiment, approximately ½ of the wavelength of the 2.45 GHz excitation signal (approximately 3 to 6 cm) has been found to reduce energy sharing among the tags. Preferably, the smallest possible spacing is used and shorter separation distances than those specified have been found to be adequate in some circumstances, particularly where other parameters such as frequency, antenna power, and others are different from the particular examples provided herein.

Instead of drawers and cabinets, bins or similar items with separators could be placed directly on the shelves or surfaces within the freezer 230. In addition, in some applications, the impact of energy sharing may be reduced through the selection of frequency, RF power, and transponder design (mainly size) such that products can be placed in a random or haphazard manner within the freezer 230.

Figure 10:
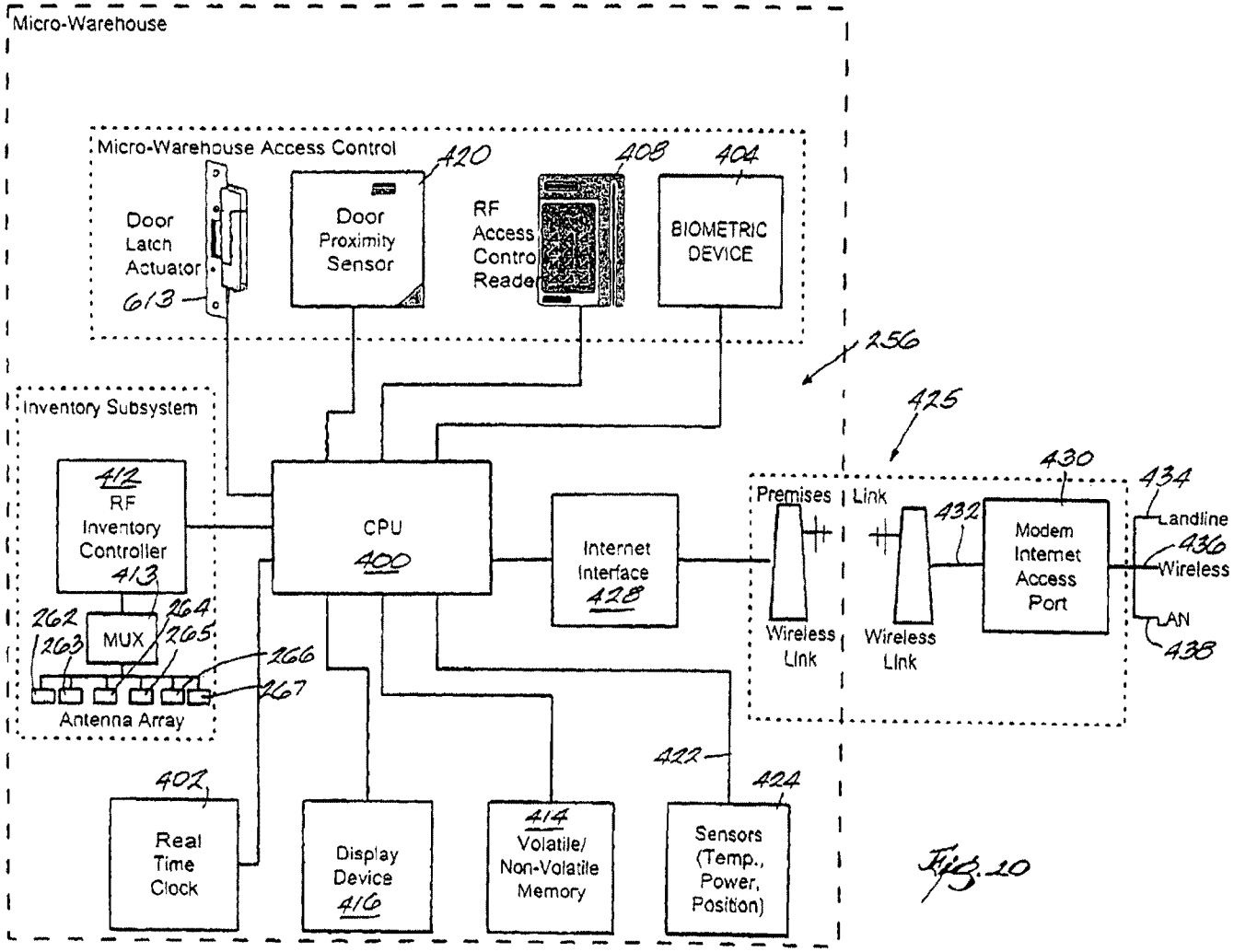
FIG. 10 is a schematic diagram of a control system used in a micro-warehouse.

FIG. 10 schematically illustrates one exemplary embodiment of the architecture of the controller 256. The controller 256 includes a central processing unit or processor 400 that receives time signals (e.g., time of day) from a real-time clock 402. In one embodiment, the real-time clock is synchronized periodically to a standard time reference, S such as the atomic standard clock at the National Institute of Standards ("NIST"), connected to the real time clock 402 through the network 28. Synchronization of the real-time clock 402 helps ensure accuracy in time stamping the transactions (e.g., taking and placing tagged products in the freezer 230) controlled by the controller 256. The processor 400 receives inputs from an optional biometric device 404, a badge or key reader or similar device 408, and the antennas 262-267. The antennas 262-267 receive information from the tagged products 270 within the freezer 230. The tags 272 on the products 270 produce identifying signals in response to being excited by signals transmitted from the antennas 262-267. The processor 400 sends signals to the antennas 262-267 through a controller 412. The controller 412 provides a command signal to a multiplexer 413, which addresses each antenna 262-267. One controller suitable for use as the controller 412 is an SCS 511 scanner with 100 398 multiplexer available from Single Chip Systems ("SCS") Corporation, San Diego, Calif. The interrogation operation (energization of and then reading of signals emitted by the tags) performed by the controller 412 and antenna array 261 will be discussed in further detail below.

The processor 400 reads and writes data to a memory 414. The processor 400 also controls a display 416, which is used to communicate with users of the freezer 230. The display 416 may be a simple lighted logo display which when lit indicates authorization of access to the freezer 230 and when unlit or lit in another color indicates denial of access to the freezer 230. A proximity sensor, e.g., the sensor 420, may be positioned on the door 236 or around the opening 234 to provide information to the processor 400 regarding whether the door 236 is opened or closed or the area comprising the MW has been accessed. Information relevant to operation of the freezer 230 and protection of the products therein, such as temperature, power status, and the like (sometimes referred to as "operational status," "heartbeat," or "health" information), is received over one or more input lines represented by communication link 422 from temperature, power, and positioning sensors, which are represented by the box 424. Communication between the processor 400 and the servers 26 and 27 (or server cluster 112) may be accomplished using a variety of technologies and hardware. FIG. 10 illustrates a wireless system 425 that is connected to an access port 430 via a communication link 432. 802.11b wireless links, available from many vendors, are suitable for use in the invention. In one preferred embodiment, wireless links from Aerocomm are used. The access port 430 may take the form of a modem or network interface device which may, in turn, be connected to an appropriate and compatible communication link such as a landline 434, wireless network 436, local area network 438, or the like. The access port 430 ultimately connects to a communication link or network (such as the network 28) that is linked to the server cluster 112.

Figure 11:
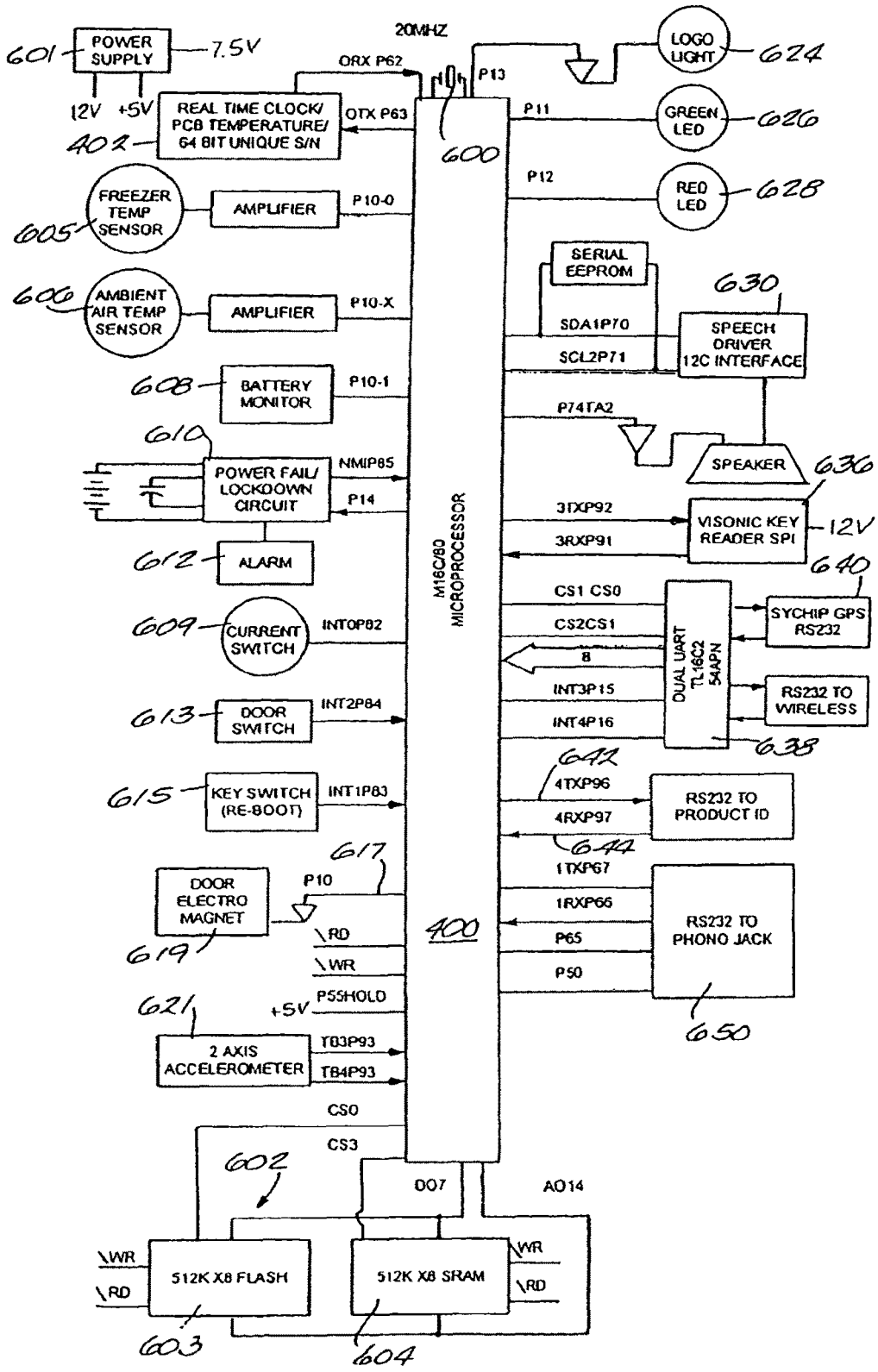
FIG. 11 is a diagram of an exemplary embodiment of the control system shown in FIG. 10.

FIG. 11 illustrates one implementation of the processor 400 shown in FIG. 10. The implementation includes an example of the processor 400 in the form of a M16C/80 chip from Mitsubishi. As would be apparent to those of ordinary skill in the art, a variety of other chips could be used. The processor 400 receives a clock signal from an oscillator 600, power from a supply circuit 601, and time signals from the real-time clock 402. Software instructions used by the processor 400 are stored on a non-volatile memory (such as EEPROM) 602. The memory 602 may be implemented using a 512 kB Flash memory integrated circuit 603 and a 512 kB SRAM integrated circuit 604.

Operational status ("health") and related information of the relevant MW is received from a MW temperature sensor 605 and an ambient temperature sensor 606. A battery monitor 608 monitors power supplied to the processor 400. A current switch 609 is used to monitor the on/off duty cycle of the current supplied to the refrigeration compressor (not shown) in the freezer 230. Information from the switch 609 as well as information from the internal and ambient temperature sensors 605 and 606 can be used to determine the relative health of the compressor.

The processor 400 is connected to a power failure/lockdown circuit 610. The power failure lockdown circuit 610 is coupled to the supply circuit 601 and works in conjunction with an alarm circuit 612. If power is cut off to the processor 400, the power failure lockdown circuit 610 causes the alarm circuit 612 to generate an audio signal in order to alert users to the power failure condition. In addition, the lockdown/powerfail circuit locks the lock 613

(FIG. 10) on the freezer 230 in order to prevent additional access to the freezer. This action protects against inventory theft and assists in maintaining the internal temperature of the freezer (which is important to protecting products therein) by maintaining the integrity of the insulated volume of air within the freezer.

In the embodiment shown in FIG. 11, two mechanical switches, a door switch or sensor 614 and a key switch 615, are used. The sensor 614 is equivalent to the sensor 420 and provides and indication of whether the door 236 is open or closed (or whether ingress or egress to a controlled or restricted access area has occurred as detected by some other sensor). The key switch 615 provides a mechanical mechanism for rebooting the processor 400 (a "hard" reboot). In addition, when turned to an off or disarm position (not shown) the key switch 615 provides an input to the processor 400 that causes the processor 400 to shut off. With the processor 400 shut off, the freezer 230 may be operated, if desired, as a normal freezer without any access restriction or inventory monitoring. As should be apparent, it is preferred that distribution of the key or keys compatible with the key switch 615 be limited to service or other authorized personnel.

The processor 400 sends control signals to an electromagnetic lock (if used) on line 617, which is coupled to an electromagnetic actuator 619 in the lock 613. Information regarding the stability of the freezer 230 is provided by an accelerometer 621. The accelerometer 621 can detect vibration or other motion caused by a variety of situations such as improper positioning of the freezer 230 or an attempt to tamper or otherwise obtain access to the freezer 230 by breaking the door 236 or lock 613 (if used).

The processor 400 may control an output light such as a logo light 624, which may be used to display the brand name of the manufacturer of the products placed within the applicable MW 36. The processor 400 may also provide output indicative of granting or denying access to the freezer 230 to a user through green LED 626 and red LED 628. Audio output, such as processor failure or similar status information, is delivered to an audio circuit 630. The processor 400 also receives inputs from an implementation of a badge or key reader in the form of reader 636. A reader suitable for use in the invention is a Visonics Key Reader, available from Visonics Inc.

Communication between the processor 400 and other devices such the server cluster 112 may be accomplished using a dual universal asynchronous receive transmit ("UART") integrated circuit 638. For example, the circuit 638 may communicate with the wireless system 425. The circuit 638 may also communicate with a GPS system (not shown) through an interface circuit 640. Communication between the processor 400 and the controller 412 occurs through two lines 642 and 644. The controller 400 may also communicate to a maintenance computer through a connector interface circuit 650.

Figure 12:
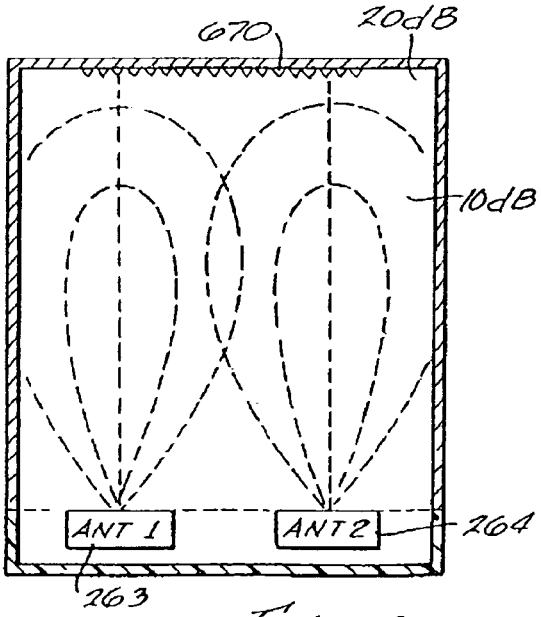
FIG. 12 is a schematic diagram of electromagnetic fields within a micro-warehouse.

FIG. 12 illustrates a simplified field model of the electromagnetic field within the freezer 230. Each antenna in the array 261 has a line of sight or bore sight represented by a straight line emanating from the respective antenna 262-267. Electromagnetic waves having a frequency of about 2.45 GHz travel outward from each antenna 262-267 into the space defined by the walls of the freezer 230 (i.e., the RF cavity). The energy of the waves diminishes. The model shown includes two lines indicating where energy of the waves is at about −20 dB and at about −20 dB level.

Figure 13:
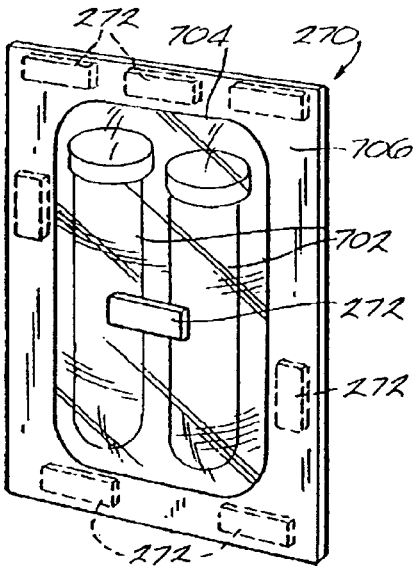
FIG. 13 is a perspective view of an exemplary packaged product illustrating possible locations for RF tags on the product.

FIG. 13 illustrates an exemplary packaged item in the form of product 270 that may be stored in the freezer 230. In the embodiment shown, the product 270 includes one or more vials 702 containing a biological assay. The product 270 also includes packaging that includes a pouch 704 and a periphery 706. The vials 702 are positioned within the pouch 704. Each product 270 also includes one tag 272, preferably a passive RF tag. FIG. 13 illustrates multiple possible locations for the tag 272 on the periphery 706 (shown in phantom) and the pouch 704. The tag 272 may be a folded-dipole, read-only tag, but other tags having other antenna geometries, such as bowtie, may be suitable in some embodiments. Read-only tags suitable for use in at least some of the embodiments discussed and illustrated are available from SCS Corporation. As noted, in at least one embodiment it is preferred that each product 270 be placed in one of the drawers 242 so that it is generally orthogonal to the transmission line of sight of those antennas 262-267 that are adjacent to the subject drawer 242. It is also preferable that the tag 272 be positioned on a portion of the packaging such that it will not be bent when placed within one of the drawers 242. Placement of the tag 272 on the pouch 704 provides a location that is less subject to bending than positions on the periphery 706. Alternatively, a rigid tag substrate or a rigid cover label may be used to prevent bending.

Having described much of the mechanical and hardware aspects of embodiments of the invention, additional details of the software will be further described. As noted above, in general, the controller 256 activates the antenna array 261. The antennas 262-267 emit signals that energize the tags 272 on the products within the freezer 230. Each tag 272 emits an identifying signal. The identifying signals from the tags 272 are received by the antennas 262-267 and delivered to the controller 256.

As may be apparent, the energization of multiple tags in a relatively small, defined volume (e.g., the RF cavity defined by the interior walls of the freezer 230) causes the tags 272 to simultaneously or nearly simultaneously emit identifying signals. The signals interfere with each other such that identifying any individual signal from any one specific tag 272 is difficult, and in some cases nearly impossible. In order to read numerous tags 272, a "cloaking" system can be used. In general, cloaking refers to shutting down or otherwise disabling transmission of the tag once it has been energized and identified by an interrogator (for example, controller 256). While cloaking is generally known, the inventors developed the specific use of the cloaking techniques described herein, including the specifications for minimum and maximum cloak time, and the cloak time distribution, with respect to RF cavity temperature.

The controller 256 executes inventory control software. In the embodiment described, the software carries out six basic steps. First, the controller 256 is initialized. Second, a baseline scan is performed. Third, access to the freezer 230 or relevant micro-warehouse is controlled based upon sensing the presence of and determining the validity of a user passkey using the badge or key reader 258 or similar device. Fourth, the operational status or health of the micro-warehouse is checked. Fifth, the inventory level of products is checked after a user has accessed the micro-warehouse (as sensed, for example, by closing of the freezer door 236). Lastly, information gathered by the controller 256 is communicated to the server cluster 112.

A more specific definition of the procedures performed by the inventory control software is set out in Table 1.

TABLE 1

| | |
|---|---|
| Scan | A single request for a list of inventory identifiers ("Inventory IDs") (i.e., identifying codes stored in the tags) with no duplicates. The scan continues until:<br>(a) a specified time limit has been reached,<br>(b) a specified rate of IDs per second is exceeded, or<br>(c) a specified limit of interval time between tag reads has been reached.<br>There are two modes of execution,<br>1. cloaked, and<br>2. uncloaked. |
| Run | A series of one or more Scans continued either until<br>(a) a specified number of Scans has been reached,<br>(b) a specified time limit has been reached,<br>(c) a specified integrity level has been reached, or<br>(d) an event (such as an RF power failure) has occurred which terminates a scan,<br>Each of (a)-(d) is a mode of execution, and one or more modes can be requested. A run is terminated on the first occurrence of a mode. Each Scan is separated by a specified time interval. |
| Inventory ID | A 6-byte, binary hexadecimal string, unique to $2^{44}$ values. The Inventory CD identifies a tagged product in a micro-warehouse. |
| Integrity Level | A percentage expressed as "0.90." |
| Inventory List | A single list of all Inventory IDs present in a micro-warehouse |
| ReadTime | The amount of time elapsed from the start of a Scan to the last tag being read. This time may also be a set and includes the time elapsed to the reading of each of any number of tags. |
| ReadTemp | The temperature of any one tag as reported by the tag during a Scan (assumes that system is implemented using tags that are capable of reporting their temperature). |
| ScanTime | Time limit for one Scan |
| ScanInterval | Time between tag ReadTimes in one Scan |
| NumScans | Number of Scans to perform in a Run |
| ScanWaitTime | Time to wait between Scans for de-cloaking |
| ReadRate | Rate of tags read per second during one Scan |

Figure 21:
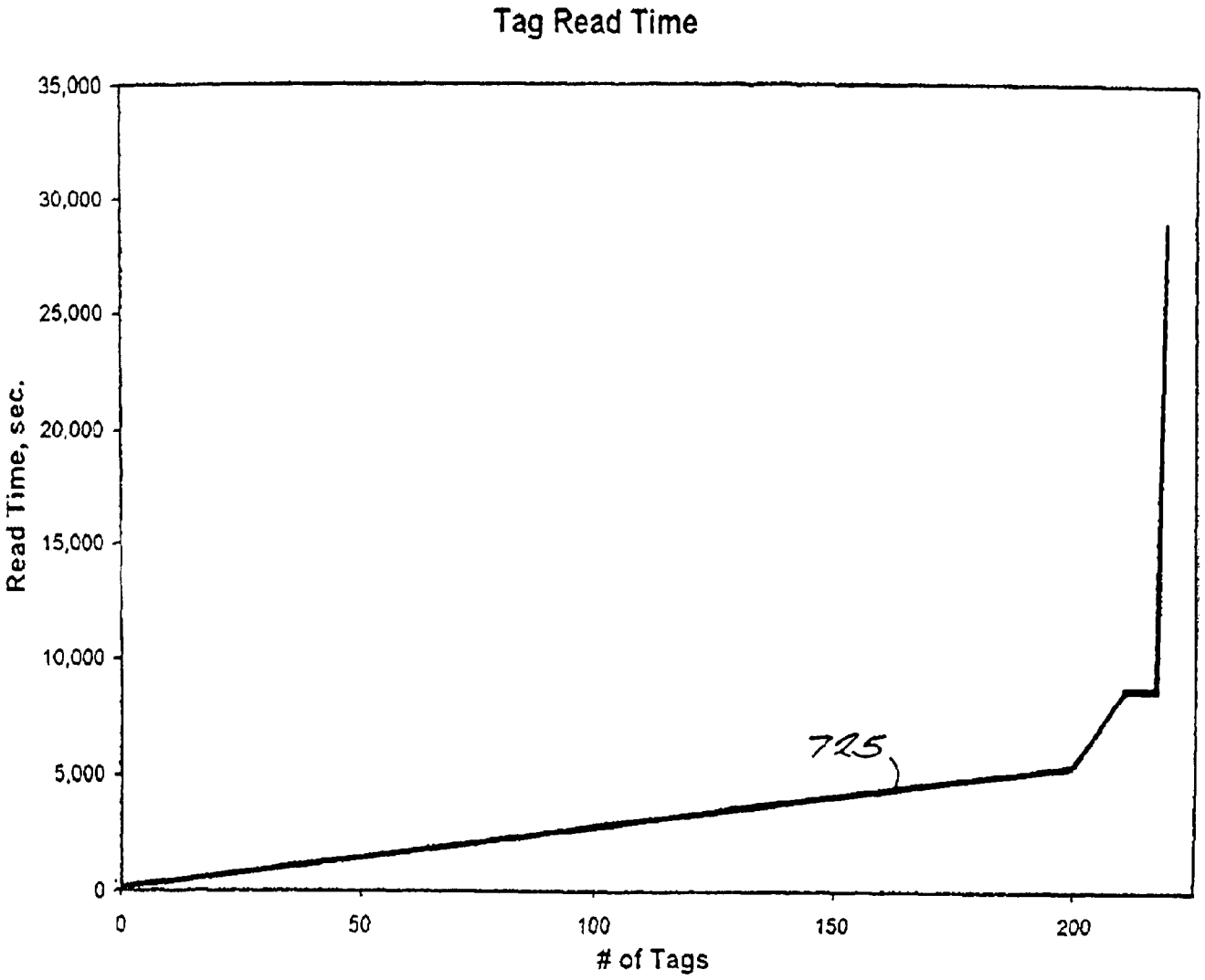
FIG. 21 is a graph of product tag read times versus the number of tagged products in a micro-warehouse.

As noted in Table 1, the read time (or for the specific embodiment discussed, "ReadTime") of a scan is the elapsed time from the start of a scan to the reading of any or all of the tags in the field generated by the antennas. The read time can be collected in either the non-cloaked or cloaked mode. The read time (which can also be a set of read times) can be sent to the server cluster 112 as part of each transaction that results from a scan. The read time can be used as a composite indicator of several operating parameters, such as temperature, product tag position in the RF cavity, RF interference in the cavity, etc. For instance, a gradual lengthening of the read time(s) for all tags in a RF cavity can correspond to an increase in interior temperature. It is possible to quantify a temperature change from the shift in a tag versus read time curve (such as the curve 725 shown in FIG. 21). As another instance, the shape of the curve of tag versus read time for the last few tags that were read can be used as an indicator of an RF anomaly in the RF cavity that is preventing the tags from getting enough power to respond. In this case, the normally linear curve becomes exponential for the last few tags. Operating parameters read from other sensors in the RF cavity, such as the temperature sensor, can be used with the read time curve to predict the condition that resulted in the change in the read time curve.

In one embodiment, the inventory control software includes three classes of runs: a base line run, an inventory run; and a background run. Definitions for Methods corresponding to these runs are set out in Table 2.

TABLE 2

| Method | Function |
|---|---|
| Baseline Run<br>Output: IntegLvl, ReadTime, ReadTemp)<br>Input: (NumScans, RunTime, IntegLvl, ScanInterval, ScanWaitTime, ScanTime, ReadRate) | A run in cloaked or uncloaked mode to establish the starting inventory list. |
| Inventory Run<br>Output: (PlusInventoryList, MinusInventoryList, IntegLvl, ReadTime, ReadTemp)<br>Input: (NumScans, RunTime, IntegLvl, ScanInterval, ScanWaitTime, ScanTime, ReadRate) | A run or runs in uncloaked (or cloaked) mode to determine a new inventory list. Uses master inventory list established at baseline, and returns the change in inventory between the master inventory list and the new inventory list as plus delta inventory and minus delta inventory. |
| Background Run<br>Output: (PlusInventoryList, MinusInventoryList, IntegLvl, ReadTime, ReadTemp)<br>Input: (NumScans, RunTime, IntegLvl, ScanInterval, ScanWaitTime, ScanTime, ReadRate) | A continuous series of scans in cloaked or uncloaked mode until a termination event occurs, such as a user presenting a badge or key to request entry. |
| Reveal Inventory<br>Output: (MasterInventoryList) | |

Classes of Runs

Baseline Run

A run in cloaked mode to establish the starting inventory list. If IntegrityLevel is not specified, the actual read integrity level is returned, that is, the number of times the majority scan list occurs. Creates the first master inventory list, consisting of the superset of all inventory IDs read throughout the baseline scans. The read integrity is returned even when an input integrity level has been set.

Inventory Run

A run or runs in uncloaked (or cloaked) mode to determine changes to the inventory list. Uses the superset of all inventory run scans as the new list of inventory. Uses master inventory list (from baseline and/or background) or most recent temporary master inventory list, whichever is more recent, and returns change in inventory between master inventory list and new inventory list, as plus delta inventory and minus delta inventory. Creates new temporary master inventory list.

Background Run

A continuous series of scans in cloaked mode until a termination event occurs. Uses a superset of all scans as the inventory list. Creates new master inventory list.

Reveal Inventory

No scans. Returns most recent master inventory list.

One useful feature of the embodiments described herein is that the manner in which the controller 256 controls the antenna array 261 may be adjusted. The adjustment may be accomplished by modifying certain software parameters, including those noted in Tables 1 and 2 (such as integrity level, read time, run time, wait time, scan interval, etc.) as circumstances change (for example, changes in temperature, tag type, RF cavity, etc.). As explained in additional detail below, these changes can be performed remotely by sending the changed parameters to the controller 256 from the server cluster 112.

Figure 14:
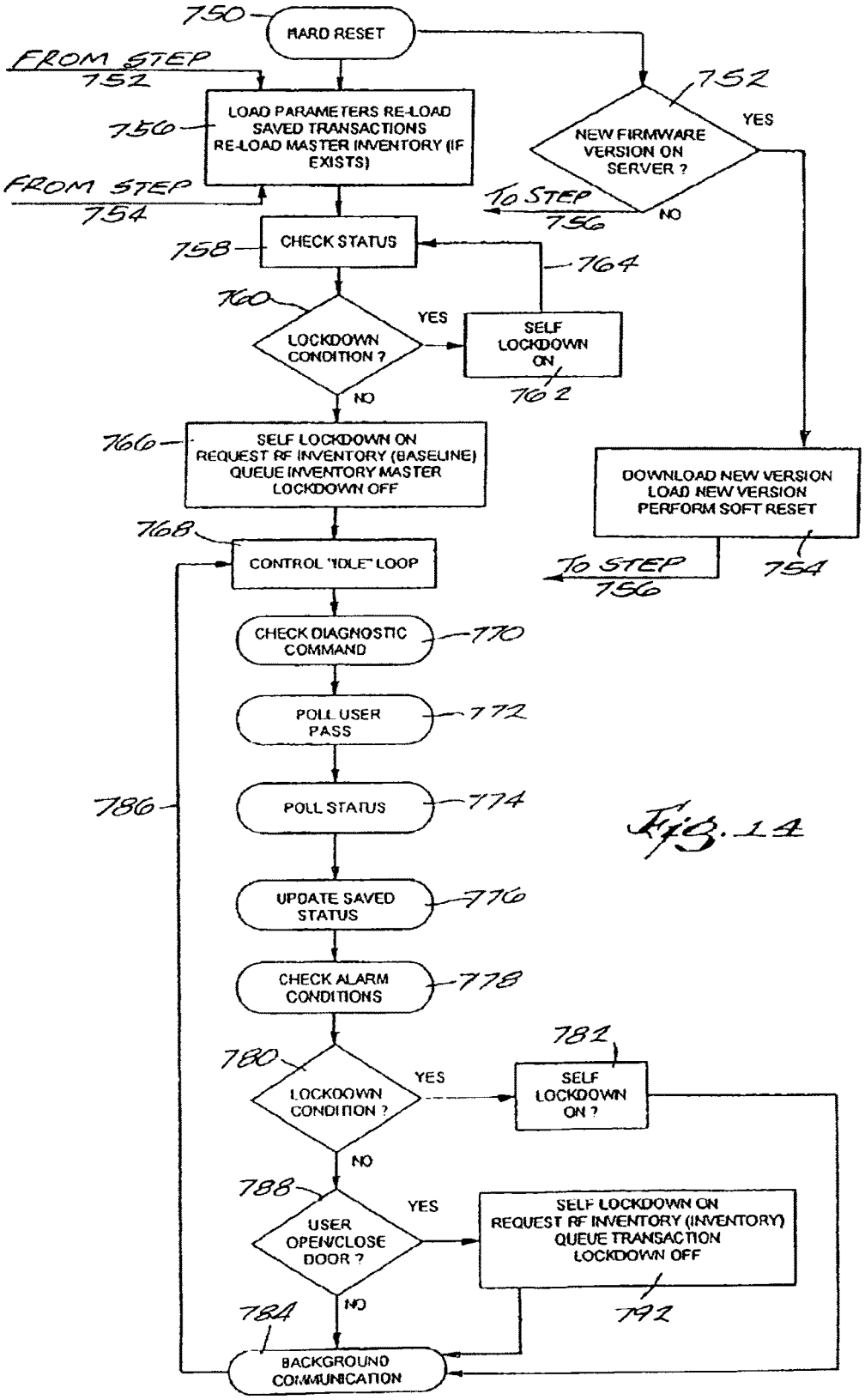
FIG. 14 is a flowchart of software used in one embodiment of the invention.

An overview of the operations performed by the inventory control software is set out in FIG. 14. At step 750, the controller 256 is reset via a hard reset by, for example, turning the key switch 615 to an arm position (not shown). At step 752, the controller checks the server cluster 1 12 to see if a new version of the controller software is available. If a new version is available, that version is downloaded and loaded into the memory 602 and a soft reset is performed, as shown at step 754. Once any necessary software updates have been performed, the controller 256 loads required parameters, reloads saved transactions, and reloads any master inventory information, if it exists, as shown at step 756. At step 758, the controller 256 checks its status. At step 760, the controller 256 determines whether a lockdown condition exists. If a lockdown condition exists, the controller sets a flag or similar device to indicate the presence of a lockdown condition (as shown at step 762) and continues to check for the presence of a lockdown condition (as shown by loop 764).

Once it is determined that a lockdown condition does not exist, the controller 256 performs a baseline run, queues (or places in a buffer) the inventory master value, and sets the lockdown flag to "off," as shown at step 766. The controller 256 then executes a control idle loop (step 768) or, more broadly, a main processing loop. In the embodiment illustrated, the control idle loop includes five basic operations: a check diagnostic command operation (step 770), a poll user pass operation (step 772), a poll status operation (step 774), an update saved status operation (step 776), and a check alarm conditions operation (step 778). These steps are discussed in greater detail below. In summary, during these operations, the controller 256 determines whether the user has an authorized key and whether any alarm or other conditions are present. If any of the alarm or status conditions meet the requirements of a lockdown situation (as determined at step 780), the lockdown flag is set to "on" (step 782), information obtained about the inventory in and status of the MW 36 is sent to the server cluster 112 (step 784, background communication) and the control idle loop is executed again (as shown by loop 786).

If a lockdown condition does not exist, the controller 256 determines whether a user has accessed the MW (step 788) as determined, for example, by the controller 256 sensing an opening and closing of the door 236. If a user has accessed the MW, an inventory run is requested and the information from the run is queued in a transaction buffer, as shown in block 792. The information gathered from the inventory run is then sent to the server cluster 112 (as shown at step 784). The controller 256 continues to execute the software until reset.

FIGS. 15 through 21 provide additional information regarding the operations (or routines) discussed above with respect to FIG. 14.

Figure 15:
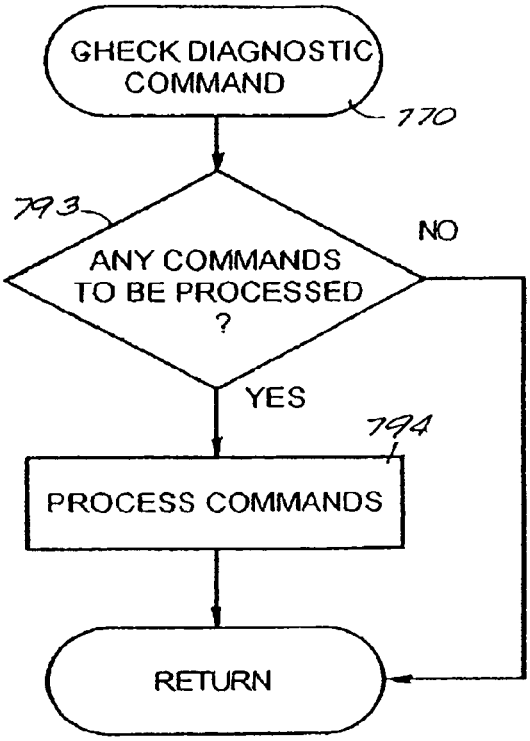
FIG. 15 is a flowchart of software of one embodiment of the invention.

As shown in FIG. 15, when the controller 256 executes the control idle loop, it determines whether any diagnostic commands need to be processed (step 793). If commands are unprocessed, the controller 256 processes those commands (step 794) and then returns to the control idle loop (step 768).

Figure 16:
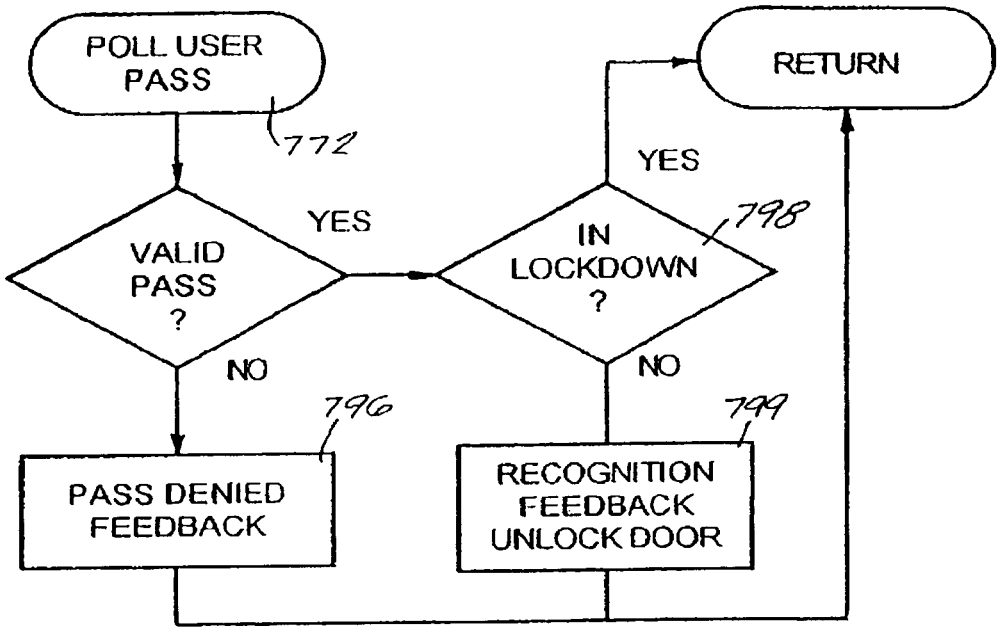
FIG. 16 is a flowchart of software of one embodiment of the invention.

As shown in FIG. 16, after processing any diagnostic commands, the controller 256 checks the validity of any key or pass presented by a user. If the key is invalid, appropriate feedback is provided by, for example, lighting the red LED 628 (step 796). The controller then returns to the control idle loop. If the key is valid, the controller checks for the existence of a lockdown condition (step 798). If a lockdown condition exists, the controller denies access to the MW and returns to the control idle loop. If a lockdown condition does not exist, access is permitted and appropriate feedback provided by, for example, lighting the green LED 626 (step 799).

Figure 17:
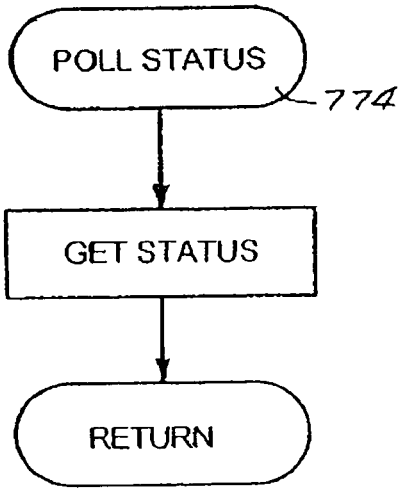
FIG. 17 is a flowchart of software of one embodiment of the invention.
Figure 18:
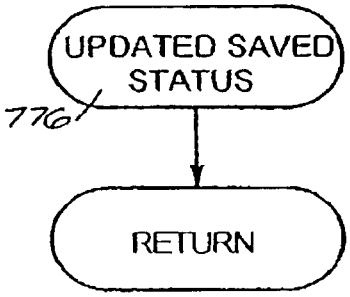
FIG. 18 is a flowchart of software of one embodiment of the invention.

FIG. 17 illustrates the operations performed during a poll status operation (step. 774). The controller 256 retrieves information from the various sensors (temperature, power, etc.) and returns to the control idle loop (step 768). As shown in FIG. 18, updating saved status information involves assigning the information retrieved during polling (step 774) to variables or registers holding prior status information.

Figure 19:
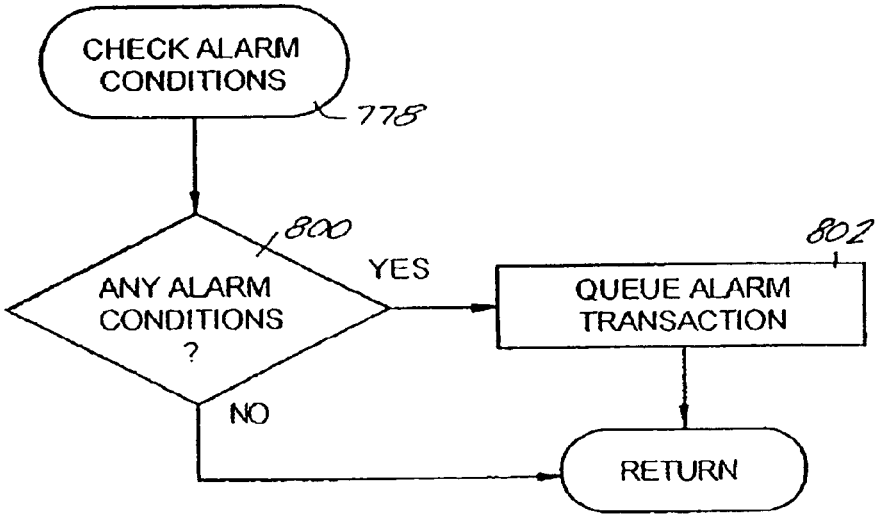
FIG. 19 is a flowchart of software of one embodiment of the invention.

As shown in FIG. 19, checking alarm conditions (step 778) involves comparing or otherwise evaluating the status information and other information, for example, shelf life, to predetermined thresholds (step 800). In the event any information exceeds or fails to meet the predetermined thresholds, as the case may be, an alarm transaction is queued (step 802). Then control is returned to the control idle loop (step 768).

Figure 20:
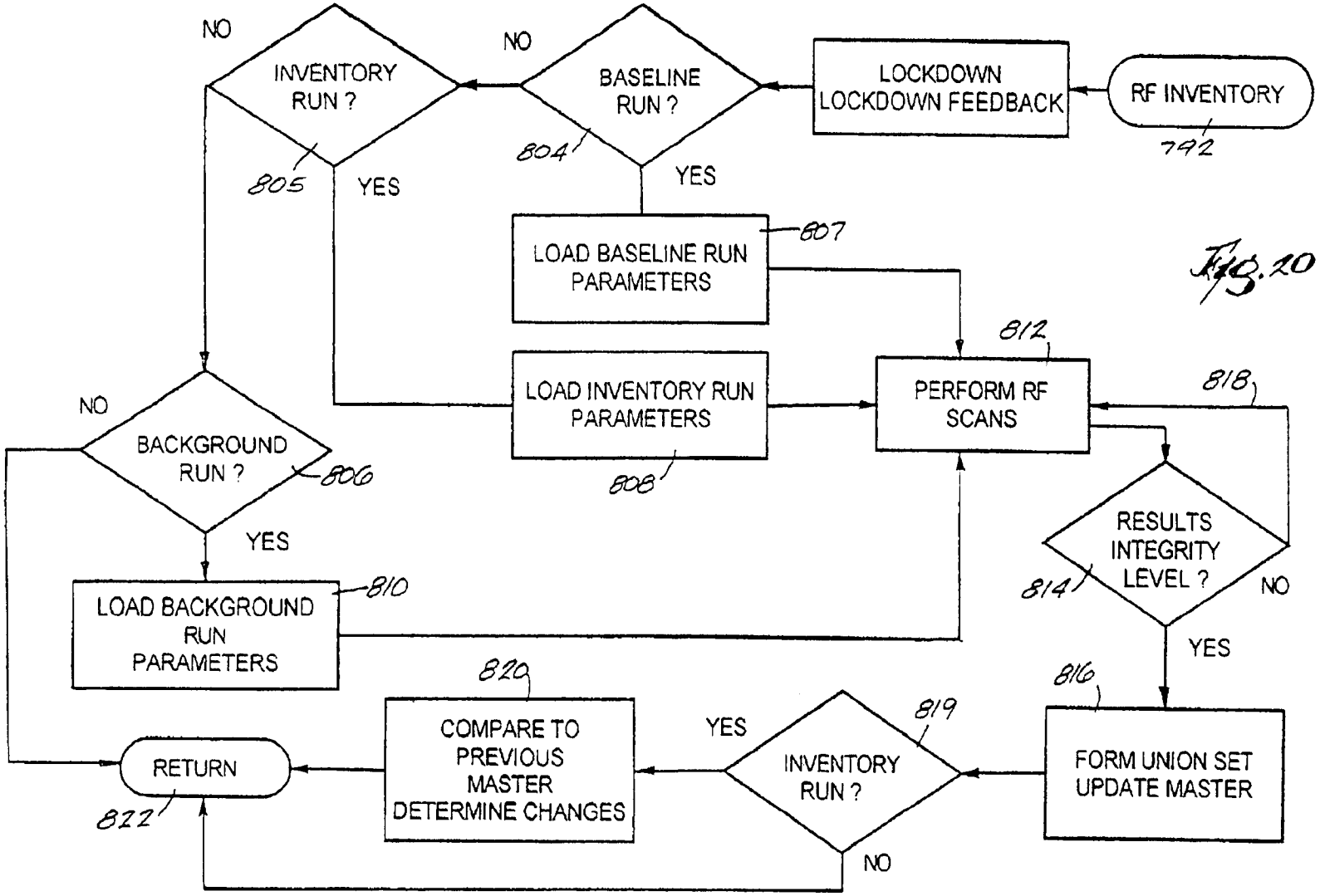
FIG. 20 is a flowchart of software of one embodiment of the invention.

FIG. 20 illustrates the functions performed by controller 256 when it executes RF inventory operations. As shown at steps 804-806, the controller 256 first determines whether the scanning operation to be performed is a baseline run or scan, an inventory run, or a background run. The type of run to be performed is passed from the control idle loop to the RF inventory module. Depending on the type of run requested, the appropriate parameters are loaded, as shown at steps 807-810. Once the parameters are loaded, an appropriate scan is performed, as shown at step 812. If the results of the scan are higher than a predetermined integrity level, a union set based on the results is formed as shown at steps 814 and 816. If the results do not meet the predetermined integrity level, additional scans are performed until the integrity level is met or exceeded, as shown by loop 818. If the type of run or scan performed was an inventory run (step 819), changes between the inventory run and previously stored information (in the example shown, the inventory master) are determined, as shown at step 820. Control is then returned to the control idle loop, as shown at step 822.

The number of scans to be used in any run is variable and is set to ensure a predetermined integrity, which, in the ideal case, is 100% integrity of recorded inventory. In one embodiment of the invention, a plurality of scans is performed such that the specified integrity level is achieved based on experimental data. A superset or union of all the scan sets is then formed. For example, in order to achieve an integrity level of 50%, the number of identical scans must be the majority set. In one embodiment, experiments have shown that the number of scans, in non-cloaked mode, should be about ten and in cloaked mode, about three. Additionally, an order (a product removal or purchase transaction), based on inventory recorded before door opening and after door closure, can be aged or buffered, that is, held for processing, either in the controller or at the server, for some time until further transactions are recorded. If the additional scans from these further transactions reveal a product recorded as taken in the previous transaction, the erroneous transaction can be corrected before billing a customer. While it is possible for the system to miss a tagged item during a scan, testing of embodiments of the invention has not resulted in a situation where a scan indicated the presence of items not physically present in the relevant MW. In any case, anomalies in recorded inventory that are picked up in later scans can be used to correct the billing information. In actual use, it is believed, and limited tests have shown, that this type of correction will be seldomly required. Further, the baseline run and the background run are not necessary in all applications, and can be selected to be used on any particular MW at the time of manufacture, field installation, or service interval.

The tags 272 may be equipped with the ability to report their temperature during a scan. A function of the temperature information obtained from the tags 272 can be used to adjust the scan and scan wait times (defined in Table 1 as Scan and ScanWait) to adjust for cloak time changes due to temperature in order to ensure inventory integrity during any run. All of the instances mentioned in the above paragraph refer to read time in cloaked mode.

Figure 22:
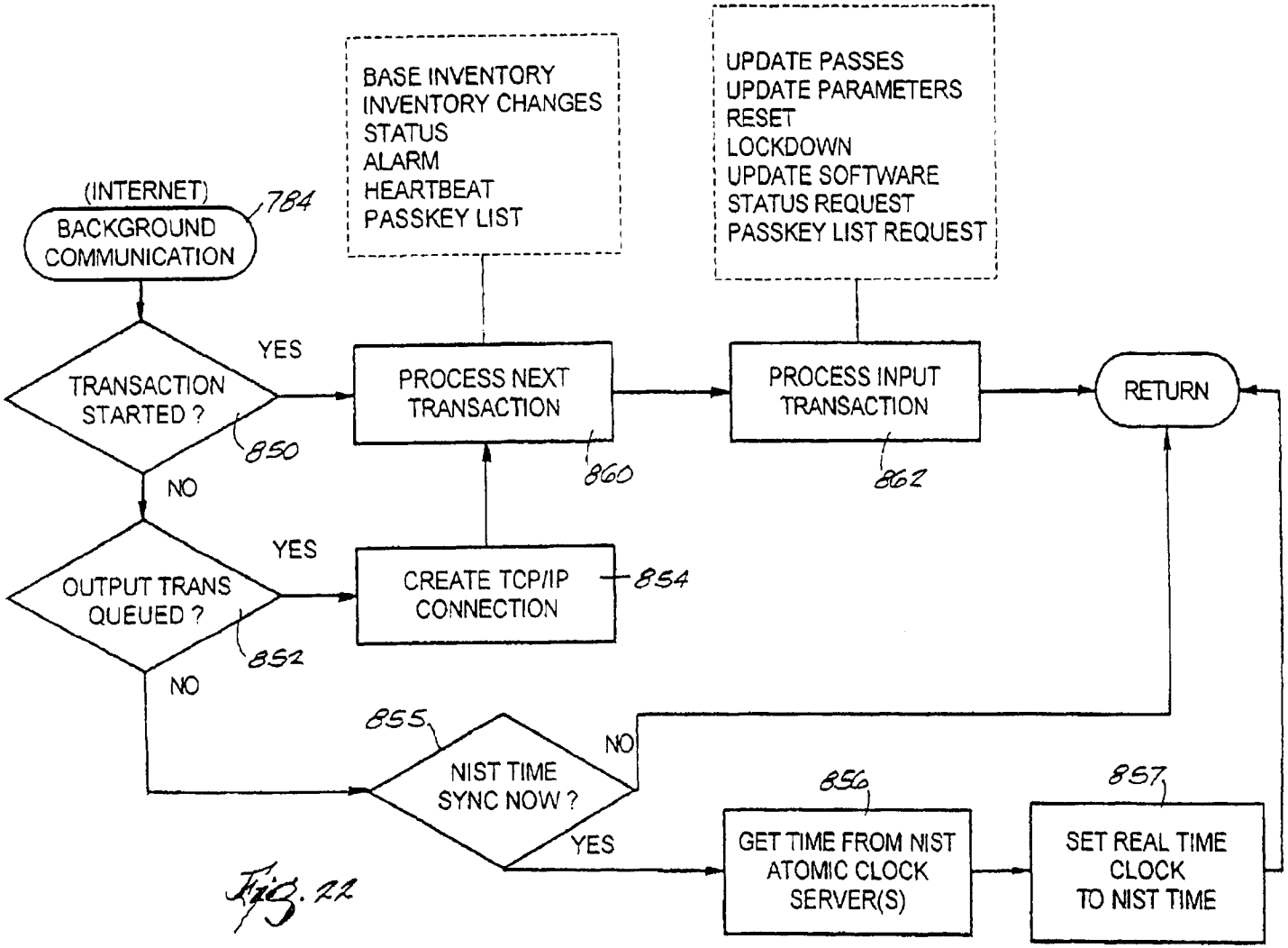
FIG. 22 is a flowchart of software of one embodiment of the invention.

Once the controller 256 has scanned the tagged products in the MW 36 or freezer 230, a message containing information regarding the scan is sent to the server cluster 112. As shown in FIG. 22, in the particular embodiment shown, the message takes the form of a background communication (step 784). The controller 256 checks, at step 850, whether a communication session or transaction between the controller 256 and the cluster 112 has already been started. If a transaction or communication has not been started, the controller 256 checks to see whether there is any information to send to the cluster 112, at step 852. If there is information to send, the controller 256 creates a connection to the server cluster 112, as shown at step 854.

If no transactions are being processed or queued, the controller 256 determines whether it should synchronize the realtime clock 402 with a standard time reference (step 855). For example, if a certain amount of time has passed since the last synchronization has occurred, the real time clock 402 is synchronized again to compensate for any variations that might have occurred since the last synchronization. If no synchronization is needed, the background communication module is exited and control is returned to the control idle loop. If synchronization is required, the clock is updated (as shown at steps 856 and 857).

If a transaction has been started or a transaction is queued, the controller 256 processes the next transaction or message to be communicated to the cluster 112 (as shown at step 860). Processing of the next transaction includes sending inventory, status, alarm, heartbeat, and passkey information to the server cluster 112. Once these transactions have been processed, the controller 256 processes input transactions for transmission to the server cluster 112 (step 862). Information such as updated passkey information, updated parameters, resets, lockdown information, software updates, status requests, and passkey lists are sent to the server cluster 112.

Figure 23:
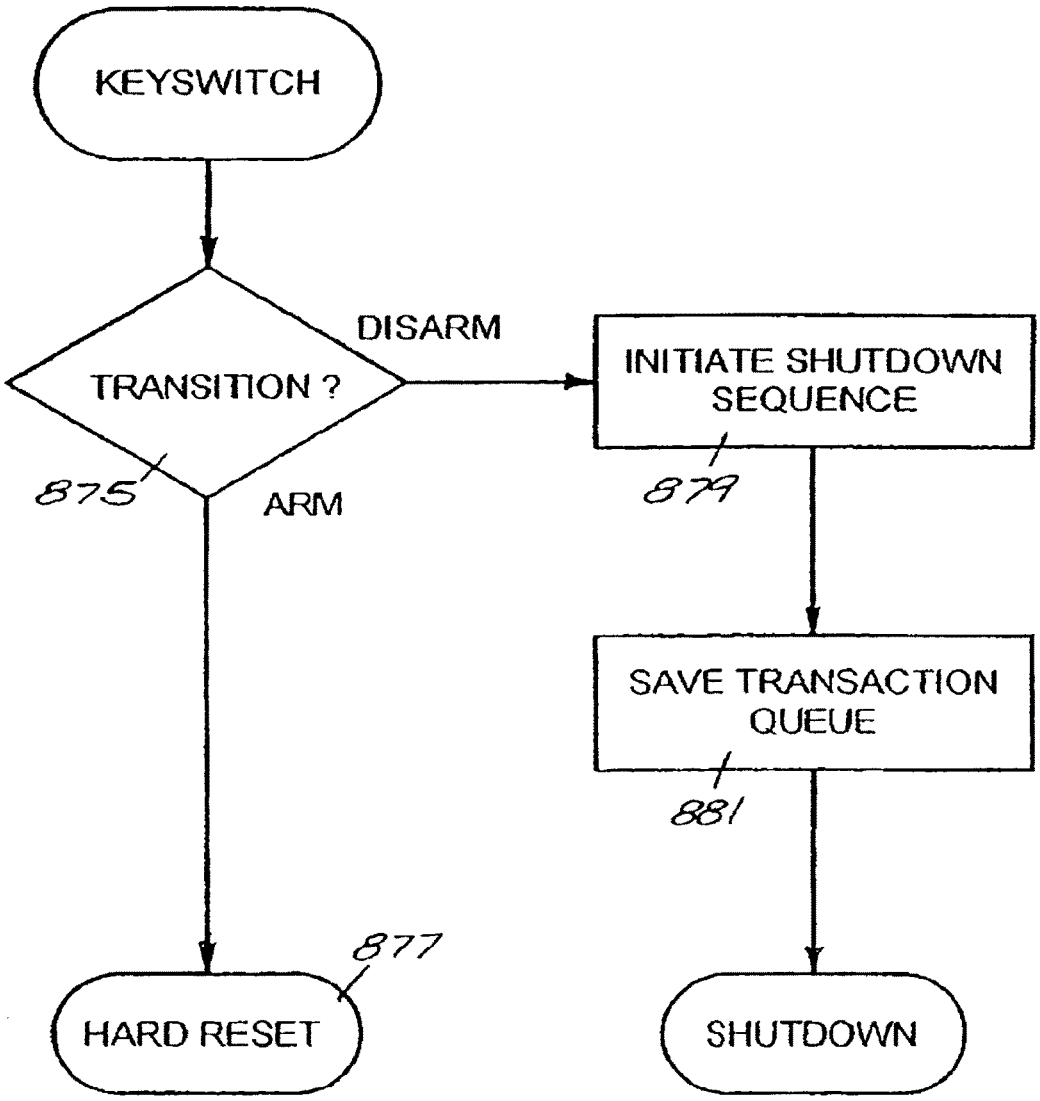
FIG. 23 is a flowchart of software of one embodiment of the invention.
Figure 24:
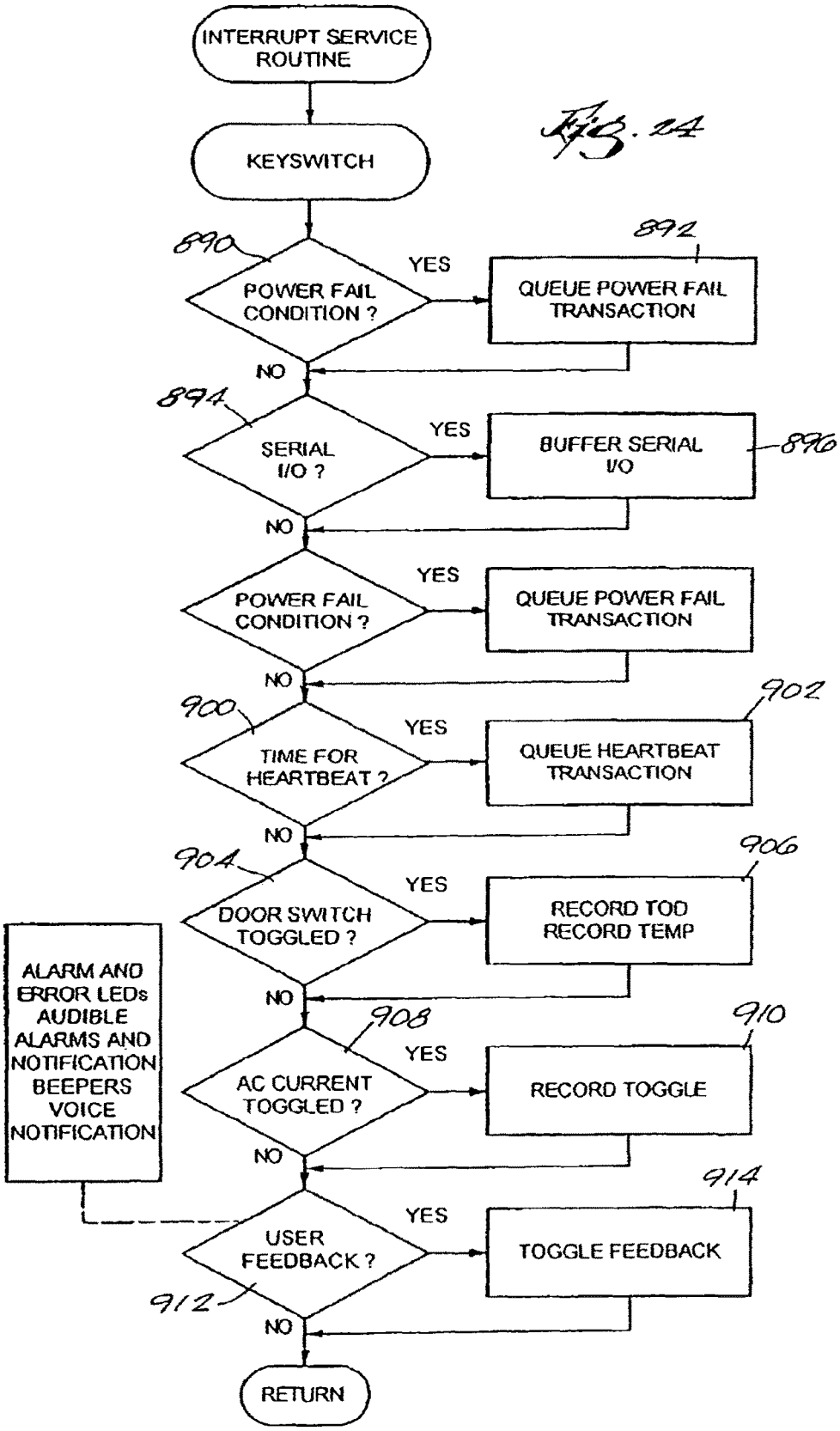
FIG. 24 is a flowchart of software of one embodiment of the invention.

FIGS. 23 and 24 illustrate operations performed by the controller 256 upon the occurrence of key switch and interrupt events. As noted above, a transition of the key switch 615 from an arm position to a disarm position causes the controller to reboot or reset itself (as shown in steps 875 and 877 in FIG. 23). If a transition from the arm position to the disarm position occurs, the controller 256 initiates a shutdown sequence and saves information in the transaction queue (as shown at steps 879 and 881).

Various events cause the controller 256 to perform certain functions. For the embodiment described, the condition of a power failure causes a power fail transaction to be queued (steps 890 and 892 in FIG. 24). The need to input or output information on a serial port causes the controller to place the input information in an I/O buffer (steps 894 and 896). Operational status (or health or heartbeat) checks are carried out at predefined times. If the time for a status check has occurred, a status check is performed and the information obtained during the check is queued for transmission to the server cluster 112 (steps 900 and 902). If the door switch or sensor is toggled, the time of day and temperature of the MW 36 are recorded (steps 904 and 906). If the current sensor senses a toggling of the AC current, the toggle is recorded (steps 908 and 910). Finally, if the controller must provide user feedback (such as providing and indication of the validity of a passkey), the user feedback is provided and appropriate feedback flags are toggled (steps 912 and 914).

As can be seen from the above, the present invention provides an RF inventory and distribution system with features to diminish the effects of energy sharing, nulls, shadowing, and other effects that degrade integrity in recording inventory changes.

Various features and advantages of the invention are set forth in the following claims.

What is claimed is:

1. An RFID cabinet for monitoring items having an RFID tag, the *RFID* cabinet comprising:

[a cabinet comprising] a back, a first side, a second side, a third side, a bottom and at least one [locking] *lockable* door;

an RFID detector for monitoring each item placed within the cabinet and for identifying the data embedded on an RFID tag located on items placed within the cabinet; and a computer coupled to the RFID cabinet, wherein the computer [controls] *is configured to control* unlocking and locking of the [locking] *lockable* door, wherein the computer is configured to receive an input that identifies a user, and wherein the computer is configured to at a plurality of times record data read from the RFID tags by the RFID detector.

2. The RFID cabinet of claim 1, wherein the cabinet is manufactured of a material so that an RFID field produced by the RFID detector is within the interior of the RFID cabinet.

3. The RFID cabinet of claim 1, wherein the RFID detector [scans] *is configured to scan* each item placed within the cabinet, such that the RFID cabinet may determine if an item is removed from the interior of the RFID cabinet.

4. The RFID cabinet of claim 1, wherein the computer has a connection chosen from a group comprising Internet and wireless.

5. The RFID cabinet of claim 1, wherein the input that identifies a user is chosen from a group comprising a password, an RFID badge, voice recognition, a mag card, or biometrics.

6. The RFID cabinet of claim 1, wherein the RFID detecting device is coupled to a network, through the computer, wherein a database provides inventory of each of the items placed within the cabinet.

7. The RFID cabinet of claim 6, wherein an inventory control module software [enables] *is configured to enable* the RFID detecting device to scan items in the cabinet and to generate a message regarding items taken.

8. The RFID cabinet of claim 1, wherein [the] *a* means for accessing the RFID cabinet comprises an RFID badge, wherein the [locking] *lockable* door of the RFID cabinet [unlocks] *is configured to unlock* in response to the RFID badge coming into proximity.

9. The RFID cabinet of claim 1, wherein there is a [strong enough] field within the cabinet such that all items can be read using the RFID detector.

10. A method for removing items having an RFID tag from an RFID cabinet, the method comprising:

providing a cabinet having an RFID detector for monitoring each item placed within the cabinet and for identifying the data embedded on an RFID tag located on each item placed within the cabinet and a computer coupled to the RFID cabinet, wherein the computer controls unlocking and locking of the [locking] *lockable* door; reading an input that identifies a user;

receiving the input that identifies a user at the computer;

unlocking the door to the RFID cabinet if the user is allowed access; and at a plurality of times scanning all the items in the RFID cabinet to determine if any items have been removed by the user.

11. The method of claim 10, further comprising disabling the RFID detector when the door to the RFID cabinet is open.

12. A method for scanning items having an RFID tag in an RFID cabinet, the method comprising:

providing a cabinet having an RFID detector for monitoring each item placed within the cabinet and for identifying the data embedded on an RFID tag located on each item placed within the cabinet and a computer coupled to the RFID cabinet, wherein the computer controls unlocking and locking of the [locking] *lockable* door, and wherein the computer is configured to receive an input that identifies a user allows access to the RFID cabinet;

reading the RFID tag associated with an item using an RFID field from the RFID detector; and recording the resulting information in a database.

13. The method of claim 12, further comprising sounding an alert if [certain] conditions programmed within [the] memory of the computer are satisfied.

14. An RFID cabinet for monitoring items having an RFID tag, the *RFID* cabinet comprising:

[a cabinet comprising] a back, a first side, a second side, a top, a bottom and at least one [locking] *lockable* front door;

an RFID detector for monitoring each item placed within the cabinet and for identifying the data embedded on an RFID tag located on items placed within the cabinet, the RFID detector located within the interior of the RFID cabinet; and a computer coupled to the RFID cabinet, wherein the computer [controls] *is configured to control* unlocking and locking of the [locking] *lockable* front door, wherein the computer is configured to receive an input that identifies a user, and wherein the computer is configured to periodically record data read from the RFID tags by the RFID detector.

15. The RFID cabinet of claim 14, wherein the cabinet is manufactured of a material that confines an RFID field produced by the RFID detector within the interior of the RFID cabinet.

16. The RFID cabinet of claim 14, wherein the RFID detector [scans] *is configured to scan* each item placed within the cabinet in a time period, such that the RFID cabinet may determine if an item is removed from the interior of the RFID cabinet.

17. The RFID cabinet of claim 16, wherein the time period is a predetermined amount of time.

18. The RFID cabinet of claim 14, wherein the computer has a connection chosen from a group comprising Internet and wireless.

19. The RFID cabinet of claim 14, wherein the input that identifies a user is chosen from a group comprising a password, an RFID badge, a bar code, voice recognition, a mag card, or biometrics.

20. The RFID cabinet of claim 14, wherein the RFID detecting device is coupled to a network, through the computer, wherein a database provides inventory of each of the items placed within the cabinet.

21. The RFID cabinet of claim 20, wherein an inventory control module software [enables] *is configured to enable* the RFID detecting device to scan items in the cabinet and to generate a message regarding items taken.

22. The RFID cabinet of claim 14, wherein [the] *a* means for accessing the RFID cabinet comprises an RFID badge, wherein the [locking] *lockable* front door of the RFID cabinet [unlocks] *is configured to unlock* in response to the RFID badge coming into proximity.

23. The RFID cabinet of claim 14, wherein the material provides a shield sufficient to allow a [strong enough] field within the cabinet such that all items can be read using the RFID detector.

24. A method for removing items having an RFID tag from an RFID cabinet, the method comprising:

providing a cabinet having an RFID detector for monitoring each item placed within the cabinet and for identifying the data embedded on an RFID tag located on each item placed within the cabinet, the RFID detector located within the interior of the RFID cabinet and a computer coupled to the RFID cabinet, wherein the computer controls unlocking and locking of the [locking] *lockable* front door; reading an input that identifies a user; receiving the input that identifies a user at the computer;

unlocking the door to the RFID cabinet if the user is allowed access; and at least periodically scanning all the items in the RFID cabinet to determine if any items have been removed by the user.

25. The method of claim 24, further comprising disabling the RFID detector when the door to the RFID cabinet is open.

26. A method for scanning items having an RFID tag in an RFID cabinet, the method comprising:

providing a cabinet having an RFID detector for monitoring each item placed within the cabinet and for identifying the data embedded on an RFID tag located on each item placed within the cabinet, the RFID detector located within the interior of the RFID cabinet and a computer coupled to the RFID cabinet, wherein the computer controls unlocking and locking of the [locking] *lockable* front door, and wherein the computer is configured to receive an input that identifies a user allows access to the RFID cabinet;

reading the RFID tag associated with an item using an RFID field from the RFID detector; and recording the resulting information in a database.

27. The method of claim 26, further comprising sounding an alert if [certain] conditions programmed within [the] memory of the computer are satisfied.

*28. The RFID cabinet of claim 1, further comprising a temperature sensor configured to provide temperature information to the computer.*

*29. The RFID cabinet of claim 1, further comprising an internal temperature sensor configured to provide internal temperature information to the computer.*

*30. The RFID cabinet of claim 29, wherein the computer is further configured to control locking and unlocking of the door based upon internal temperature information provided by the internal temperature sensor.*

*31. The RFID cabinet of claim 29, wherein the computer is further configured to:*

*determine, based on the internal temperature information, whether an internal temperature is within an appropriate range; and*

*maintain the door in a locked state in response to determining the internal temperature is not within the appropriate range regardless of whether the input identifies an authorized user.*

*32. The RFID cabinet of claim 29, further comprising an ambient temperature sensor configured to provide ambient temperature information to the computer.*

*33. The RFID cabinet of claim 29, wherein the computer is further configured to periodically read the internal temperature sensor and transmit internal temperature information.*

*34. The RFID cabinet of claim 1, further comprising a refrigeration compressor configured to cool an interior space of the cabinet.*

*35. The RFID cabinet of claim 1, wherein the cabinet is a refrigerator.*

*36. The RFID cabinet of claim 1, wherein the cabinet is a freezer.*

* * * * *